(12) United States Patent
Sitter et al.

(10) Patent No.: US 10,761,320 B2
(45) Date of Patent: Sep. 1, 2020

(54) OPTICAL STACK INCLUDING A GRATING

(71) Applicant: 3M INNOVATIVE PROPERTIES COMPANY, St. Paul, MN (US)

(72) Inventors: Brett J. Sitter, Cottage Grove, MN (US); Matthew M. Philippi, St. Paul, MN (US); Mary M. Pichotta, Minneapolis, MN (US); Chi Zhang, San Jose, CA (US); Daniel W. Hennen, Cottage Grove, MN (US); Gary T. Boyd, Woodbury, MN (US); Michael E. Lauters, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 169 days.

(21) Appl. No.: 15/775,946

(22) PCT Filed: Nov. 29, 2016

(86) PCT No.: PCT/US2016/063954
§ 371 (c)(1),
(2) Date: May 14, 2018

(87) PCT Pub. No.: WO2017/100033
PCT Pub. Date: Jun. 15, 2017

(65) Prior Publication Data
US 2018/0329207 A1 Nov. 15, 2018

Related U.S. Application Data

(60) Provisional application No. 62/265,113, filed on Dec. 9, 2015.

(51) Int. Cl.
*G02B 5/18* (2006.01)
*G02B 27/00* (2006.01)
(Continued)

(52) U.S. Cl.
CPC ........ *G02B 27/0018* (2013.01); *B32B 25/042* (2013.01); *G02B 5/003* (2013.01); *G02B 5/0215* (2013.01); *G02B 5/1861* (2013.01)

(58) Field of Classification Search
CPC .. G02B 5/003; G02B 5/18; G02B 2005/1804; G02B 5/1814; G02B 5/1842;
(Continued)

(56) References Cited

U.S. PATENT DOCUMENTS 4,374,077 A  2/1983 Kerfeld
4,576,850 A  3/1986 Martens
(Continued)

FOREIGN PATENT DOCUMENTS

CN     85100054      8/1986
JP     2011-232681   11/2011
(Continued)

OTHER PUBLICATIONS

International Search report for PCT International Application No. PCT/US2016/063954 dated Feb. 28, 2017, 3 pages.

*Primary Examiner* — Arnel C Lavarias
(74) *Attorney, Agent, or Firm* — Clifton F. Richardson

(57) ABSTRACT

An optical stack including a periodically varying optical film layer and a grating assembly for reducing moiré is described. The grating assembly includes first and second layers where an interface between the first and second layers define a grating having a peak to valley height and an index contrast. The index contrast multiplied by the peak to valley height may be between 150 nm and 350 nm and the grating has a pitch in the range of 2 micrometers to 50 micrometers. Each of the first and second layers may be viscoelastic or elastomeric adhesive layers, crosslinked resin layers, or soluble resin layers.

20 Claims, 16 Drawing Sheets

(51) Int. Cl.
*G02B 5/02* (2006.01)
*B32B 25/04* (2006.01)
*G02B 5/00* (2006.01)

(58) Field of Classification Search
CPC .... G02B 5/1866; G02B 5/189; G02B 5/1895; G02B 5/22; G02B 27/42; G02B 24/4205; G02B 27/4233; G02B 27/4272; G02B 27/4277; G02B 2207/123
USPC ....... 359/558, 566, 567, 569, 574, 575, 576, 359/599, 601, 613, 614
See application file for complete search history.

(56) References Cited

U.S. PATENT DOCUMENTS

| | | |
|---|---|---|
| 5,175,030 A | 12/1992 | Lu |
| 5,183,597 A | 2/1993 | Lu |
| 5,271,968 A | 12/1993 | Coyle |
| 5,528,319 A | 6/1996 | Austin |
| 5,534,391 A | 7/1996 | Wang |
| 5,558,740 A | 9/1996 | Bernard |
| 5,995,690 A | 11/1999 | Kotz |
| 6,208,466 B1 | 3/2001 | Liu |
| 7,140,812 B2 | 11/2006 | Bryan |
| 7,328,638 B2 | 2/2008 | Gardiner |
| 7,350,442 B2 | 4/2008 | Ehnes |
| 8,213,082 B2 | 7/2012 | Gaides |
| 8,816,578 B1 | 8/2014 | Peng |
| 9,862,124 B2 * | 1/2018 | Radcliffe ................ B29C 41/22 |
| 10,353,214 B2 * | 7/2019 | Sitter ................. G02B 27/4216 |
| 2002/0012248 A1 | 1/2002 | Campbell |
| 2007/0212535 A1 | 9/2007 | Sherman |
| 2008/0062523 A1 | 3/2008 | Rancourt |
| 2009/0165943 A1 | 7/2009 | Kim |
| 2010/0086743 A1 | 4/2010 | Wang |
| 2010/0201242 A1 | 8/2010 | Liu et al. |
| 2012/0038990 A1 | 2/2012 | Hao |
| 2013/0011608 A1 | 1/2013 | Wolk |
| 2013/0338251 A1 | 12/2013 | Joly |

FOREIGN PATENT DOCUMENTS

| | | |
|---|---|---|
| WO | WO 2000-048037 | 8/2000 |
| WO | WO 2007-118122 | 10/2007 |
| WO | WO 2009-085581 | 7/2009 |
| WO | WO 2015-116652 | 8/2015 |
| WO | WO 2015-153329 | 10/2015 |
| WO | WO 2015-191339 | 12/2015 |
| WO | WO 2015-191949 | 12/2015 |
| WO | WO 2016-172428 | 10/2016 |

\* cited by examiner

US 10,761,320 B2

OPTICAL STACK INCLUDING A GRATING

BACKGROUND

Periodic optical films may be placed over a display for various reasons. For example, a film including periodic louvers may be used as a privacy film. Periodic optical films are prone to producing unwanted moiré patterns when placed over periodically arranged pixels in a display.

SUMMARY

In some aspects of the present description an optical stack including a grating assembly and a periodically varying optical film layer disposed adjacent the grating assembly is provided. The grating assembly includes a first and a second layer and a first interface between the first layer and the second layer defines a first grating. The first layer has a refractive index $n_1$, the second layer has a refractive index $n_2$, the first grating has a peak to valley height of $h_1$, and $|n_1-n_2|$ multiplied by $h_1$ is between 150 nm and 350 nm. The first grating has a first pitch in a range of 2 micrometers to 50 micrometers. Each of the first and second layers are selected from the group consisting of viscoelastic or elastomeric adhesive layers, crosslinked resin layers, and soluble resin layers.

In some aspects of the present description a polarizer stack including a grating assembly and a polarizer disposed adjacent the grating assembly is provided. The grating assembly includes a first and a second layer and a first interface between the first layer and the second layer defines a first grating. The first layer has a refractive index $n_1$, the second layer has a refractive index $n_2$, the first grating has a peak to valley height of $h_1$, and $|n_1-n_2|$ multiplied by $h_1$ is between 150 nm and 350 nm. The first grating has a first pitch in a range of 2 micrometers to 50 micrometers. Each of the first and second layers are selected from the group consisting of viscoelastic or elastomeric adhesive layers, crosslinked resin layers, and soluble resin layers. The polarizer stack in an integral stack.

In some aspects of the present description an optical stack including a first grating and a periodically varying optical film layer disposed adjacent the first grating is provided. The first grating has a periodically modulated refractive index and includes alternating first and second regions, the first region having a refractive index $n_1$, the second region having a refractive index $n_2$. The first grating has a thickness of h and $|n_1-n_2|$ multiplied by h is between 150 nm and 10 micrometers. The first grating has a first pitch in a first direction in a range of 2 micrometers to 50 micrometers. The optical stack is configured to be placed over a display or placed between a backlight and a display panel.

In some aspects of the present description an optical stack including a louver film and a first grating adjacent the louver film is provided. The first grating has a periodically modulated refractive index and includes alternating first and second regions, the first region having a refractive index $n_1$, the second region having a refractive index $n_2$. The first grating has a thickness of h and $|n_1-n_2|$ multiplied by h is between 150 nm and 10 micrometers. The first grating has a first pitch in a first direction in a range of 2 micrometers to 50 micrometers. The optical stack is an integral stack.

DETAILED DESCRIPTION

In the following description, reference is made to the accompanying set of drawings that form a part of the description hereof and in which are shown by way of illustration specific embodiments. The figures are not necessarily to scale. Unless indicated otherwise, similar features for one embodiment may include the same materials, have the same attributes, and serve the same or similar functions as similar features for other embodiments. Additional or optional features described for one embodiment may also be additional or optional features for other embodiments, even if not explicitly stated, where appropriate. It is to be understood that other embodiments are contemplated and may be made without departing from the scope or spirit of the present description. The following detailed description, therefore, is not to be taken in a limiting sense.

As used herein, layers, components, or elements may be described as being adjacent one another. Layers, components, or elements can be adjacent one another by being in direct contact, by being connected through one or more other components, or by being held next to one another or attached to one another. Layers, components, or elements that are in direct contact may be described as being immediately adjacent.

Grating assemblies having a structured surface or structured interface can provide useful optical effects. For example, the structured surface or structured interface can provide diffraction of a light that is transmitted through the article. According to the present description, it has been found that grating assemblies can be selected to reduce moiré when included with a periodically vary optical film that is placed over a display or placed between a backlight and a display panel, for example.

Figure 13:
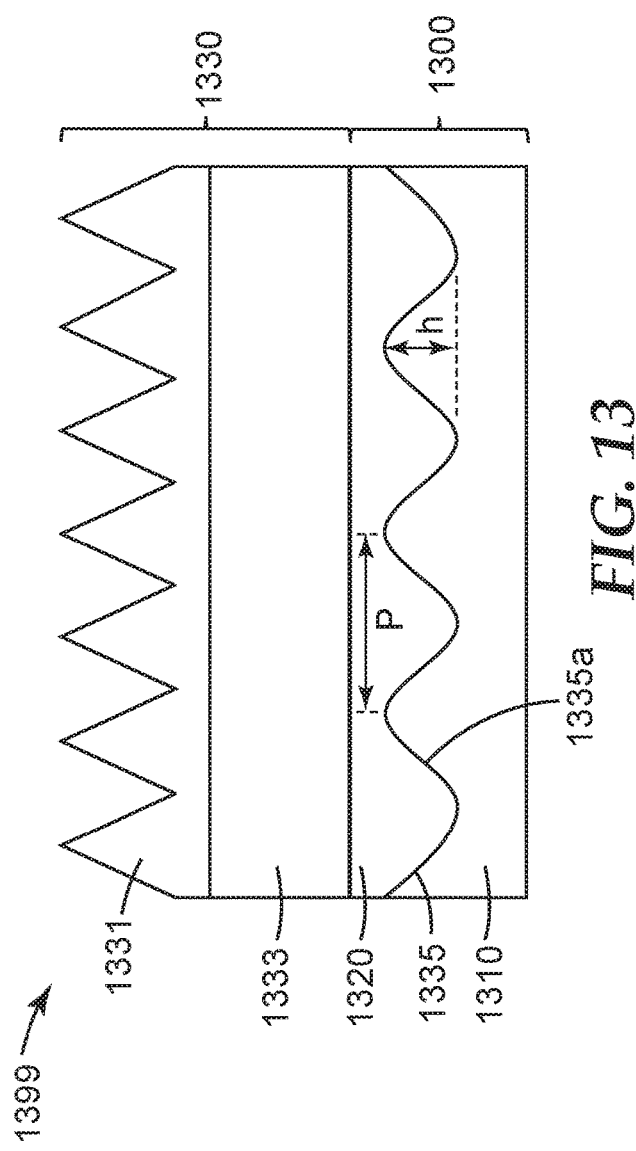
FIG. 13 is a cross-sectional view of an optical stack.

FIG. 13 is a cross-sectional view of optical stack 1399 including grating assembly 1300 and optical film 1330. Grating assembly 1300 includes first and second layers 1310 and 1320, and an interface 1335 between the first and second layers 1310 and 1322 define a grating 1335a. Optical film 1330 includes a periodically varying optical film layer 1331 disposed on a substrate 1333. In the illustrated embodiment, periodically varying optical film layer 1331 includes a plurality of prisms arranged periodically with a substantially constant pitch between neighboring prims. The grating assembly 1300 may be adapted to produce diffraction peaks when placed over a display, or when placed between a display panel and a backlight, which reduce the appearance of moiré generated by the interaction of optical film 1330 with the display. Grating 1335a has a peak to valley height of h and a pitch of P. The first layer 1310 has a refractive index $n_1$ and the second layer 1320 has a refractive index $n_2$. The peak to valley height h, the pitch P, and the index contrast (absolute value of the difference in refractive index $|n_1-n_2|$ of materials on opposite side of the interface 1335) may be selected to produce a desired degree of diffraction as described further elsewhere herein. In some embodiments, both of the first and second layers 1310 and 1320 are selected from the group consisting of viscoelastic or elastomeric adhesive layers, crosslinked resin layers, and soluble resin layers. Grating assembly 1300 may be made, for example, by casting a resin against substrate 1333 and curing against a structured tool to form second layer 1320. The first layer 1310 may then be coated onto the second layer 1320. In this case, second layer 1320 may be a crosslinked resin layer and first layer 1310 may be a viscoelastic or elastomeric adhesive layer, for example. In some embodiments, the grating assemblies of the present description include outer layers which are adhesives (e.g., viscoelastic or elastomeric adhesives) so that the grating assemblies may be optical adhesives that may be used to laminate a periodically varying optical film to another layer or to a surface of a display, for example. Additional grating assemblies and methods of making grating assemblies are described further elsewhere herein.

According to the present description, it has been discovered that grating structures that can be used to reduce sparkle in a display application can also be used to reduce moiré. Grating structures that generate a controlled degree of diffraction are described in PCT Pub. No. WO 2015/191339 (Sitter et al.), which is hereby incorporated herein by reference to the extent that it does not contradict the present description. Typically, it is desired that the diffraction grating produce low order diffraction peaks which reduce moiré without sacrificing perceived image resolution. The optical stacks of the present description can include gratings that are effective at producing diffraction of light from a display incident on a major surface of the optical stacks.

The distribution of intensity of the diffraction peaks generated by diffraction gratings is a function of the product of the index contrast across the grating and the peak to valley height of the grating. As used herein, refractive index and index contrast refers to refractive index measurements using light having a wavelength of 532 nm at 25° C. and atmospheric pressure unless otherwise indicated. The index contrast times the peak to valley height can be adjusted so that diffraction peaks that reduce moiré appear with a relative high intensity while diffraction peaks that would degrade effective resolution appear with low intensity or do not measurably appear at all. The range of useful values for the product of the index contrast and the peak to valley height may depend on the shape of the grating. The gratings may have any periodically repeating shape, for example a sinusoidal shape, a square wave shape, a cube-corner shape, or the gratings may have other periodically repeating regular or irregular shapes. The gratings may be one-directional (i.e., periodic in one direction and extending in a substantially orthogonal direction) or may be two-directional having a shape that repeats in two directions.

In some embodiments, the grating is oriented at an oblique angle (e.g., 5 degrees to 85 degrees, or 10 degrees to 80 degrees) relative to the periodically varying optical film layer. For example, in some embodiments, the grating has a first pitch in a first direction and the periodically varying optical film has a second pitch along a different second direction. In some embodiments, a ratio of the second pitch to the first pitch is in a range of about 1 to about 200. In some embodiments, the grating assembly has two repeat directions (e.g., with a single two-directional grating or with two one-directional gratings) and in some embodiments, each of the two repeat directions is oriented at an oblique angle relative to one or two repeat directions of a periodically varying optical film. In some embodiments, an optical stack including a grating assembly and a periodically varying optical film layer may be attached to a display panel including a plurality of discrete spaced apart pixels arranged in a periodic pattern. The repeat directions of the grating, the periodically optical film layer and the display panel may be arranged at oblique angles relative to one another. In some embodiments, the grating assembly has a first pitch and the pixels of the display panel has a second pitch, and a ratio of the second pitch to the first pitch is in a range of about 0.1 to about 200.

For any of the embodiments discussed herein, the index contrast for any grating multiplied by the peak to valley height of the grating or by the thickness of the grating may be greater than about 100 nm, or greater than about 150 nm, or greater than about 200 nm and less than about 10 micrometers, or less than about 5 micrometers, or less than about 3 micrometers, or less than about 2 micrometers, or less than about 1 micrometers, or less than about 500 nm, 400 nm, or less than about 350 nm, or less than about 300 nm. The peak to valley height may be understood to be the peak to valley height along a repeat direction of the grating. The peak to valley height of a grating or a thickness of a grating may be denoted by h. In some embodiments, $|n_1-n_2|$ multiplied by h is between about 100 nm and about 2 micrometers or between about 150 nm and about 500 nm or between about 150 nm and about 350 nm. In some embodiments, h multiplied by $|n_1-n_2|$ is in a range of about 150 nm to about 350 nm and the pitch is in a range of about 2 micrometers to about 50 micrometers. Such grating geometries have been found to be effective in reducing moiré without significantly degrading perceived image resolution.

In some embodiments, such grating assemblies may be made on a carrier film such as polyethylene terephthalate (PET). However, it may be desired to use a grating assembly in an optical stack in a display or other optical application where it is desired for the optical stack to be thin. Using an additional carrier film can add unwanted thickness to the grating assembly. Using an additional carrier film can also add deleterious optical effects. For example, carrier films, which are typically high molecular weight thermoplastic polymer films such as PET, have some degree of birefringence which can result in unwanted optical artifacts. In addition, the use of additional carrier films can degrade the transmittance of the grating assembly by providing additional interfaces that reflect some portion of light incident on the optical stack. In some embodiments of the present description, the grating assembly is formed directly on a periodically varying optical film such that no additional substrate is added to the optical stack including the grating assembly and the periodically varying optical film. For example, prism film 1330 includes substrate 1333 and, in some embodiments, no additional substrates are included in optical stack 1399. For example, second layer 1320 may be an adhesive layer and first layer 1310 may be a crosslinked resin layer so that grating assembly 1300 does not include an additional substrate.

Figure 14A:
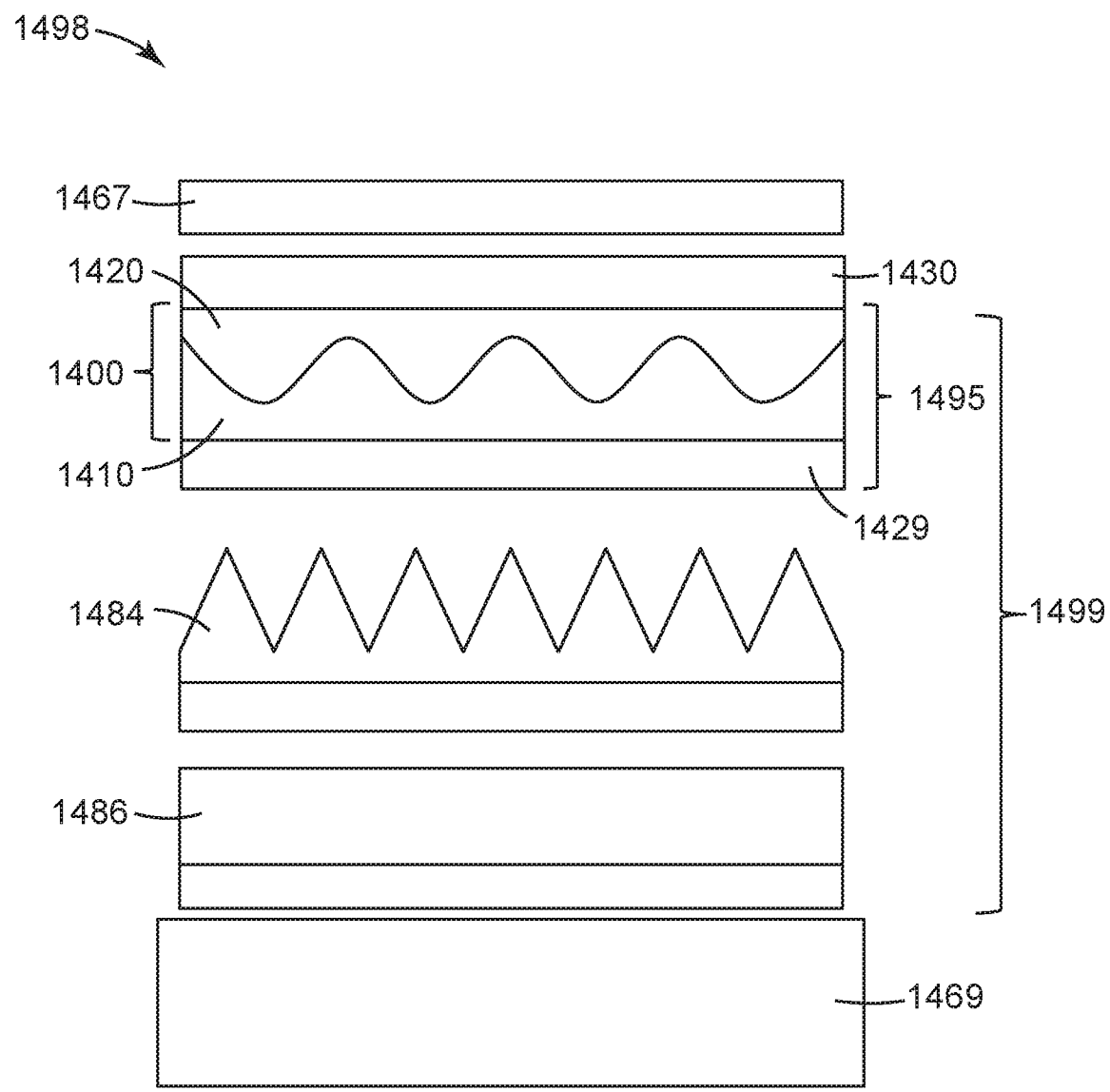
FIGS. 14A-14B are schematic cross-sectional views of displays.

FIG. 14A is a schematic cross-sectional view of display system 1498 including a liquid crystal display panel 1467, a backlight 1469, and an optical stack 1499 which includes polarizer stack 1495 and first and second periodically varying optical films 1484 and 1486 which in the illustrated embodiment are crossed prism films. Optical stack 1499 is disposed between liquid crystal display panel 1467 and backlight 1469. Suitable prism films include Brightness Enhancement Films (BEF) available from 3M Company (St. Paul, Minn.). Polarizer stack 1495 includes grating assembly 1400 and polarizer 1429. Grating assembly 1495 may be any of grating assemblies described herein or may include any of the gratings described herein. Grating assembly 1400 includes first and second layers 1410 and 1420, which may be viscoelastic or elastomeric adhesive layers, for example, having a structured interface therebetween. Polarizer 1429 may be any polarizer suitable for use in a display application such as a reflective polarizer, and absorptive polarizer, or a combination of a reflective and absorptive polarizer. Suitable polarizers include Advanced Polarizing Film (APF) and Dual Brightness Enhancement Film (DBEF), both available from 3M Company (St. Paul, Minn.).

Polarizer stack 1495 may be an integral optical stack and may optionally be attached to a substrate such as substrate 1430 which may be a polymeric substrate, for example. Alternatively, the substrate 1430 may be omitted. In some embodiments, polarizer stack 1495 may be attached directly to liquid crystal display panel 1467. An optical stack may be described as integral if each layer in the optical stack is laminated or otherwise attached to the neighboring layers in the stack. Polarizer stack 1495 can be made, for example, by forming grating assembly 1400 from adhesive layers as described further elsewhere herein and laminating grating assembly 1400 between polarizer 1429 and substrate 1430. Alternatively, in some embodiments, first layer 1410 can be cast onto polarizer 1429 and then cured against a mold and second layer 1420 can be coated onto first layer 1410. In other embodiments, second layer 1420 can be cast and cured on substrate 1430 and then first layer 1410 can be coated onto second layer 1420. In this case, first layer 1410 may be an adhesive layer which may be laminated to polarizer 1429. Additional grating assemblies suitable for use in a polarizer stack and methods of making the grating assemblies are described further elsewhere herein.

Figure 14B:
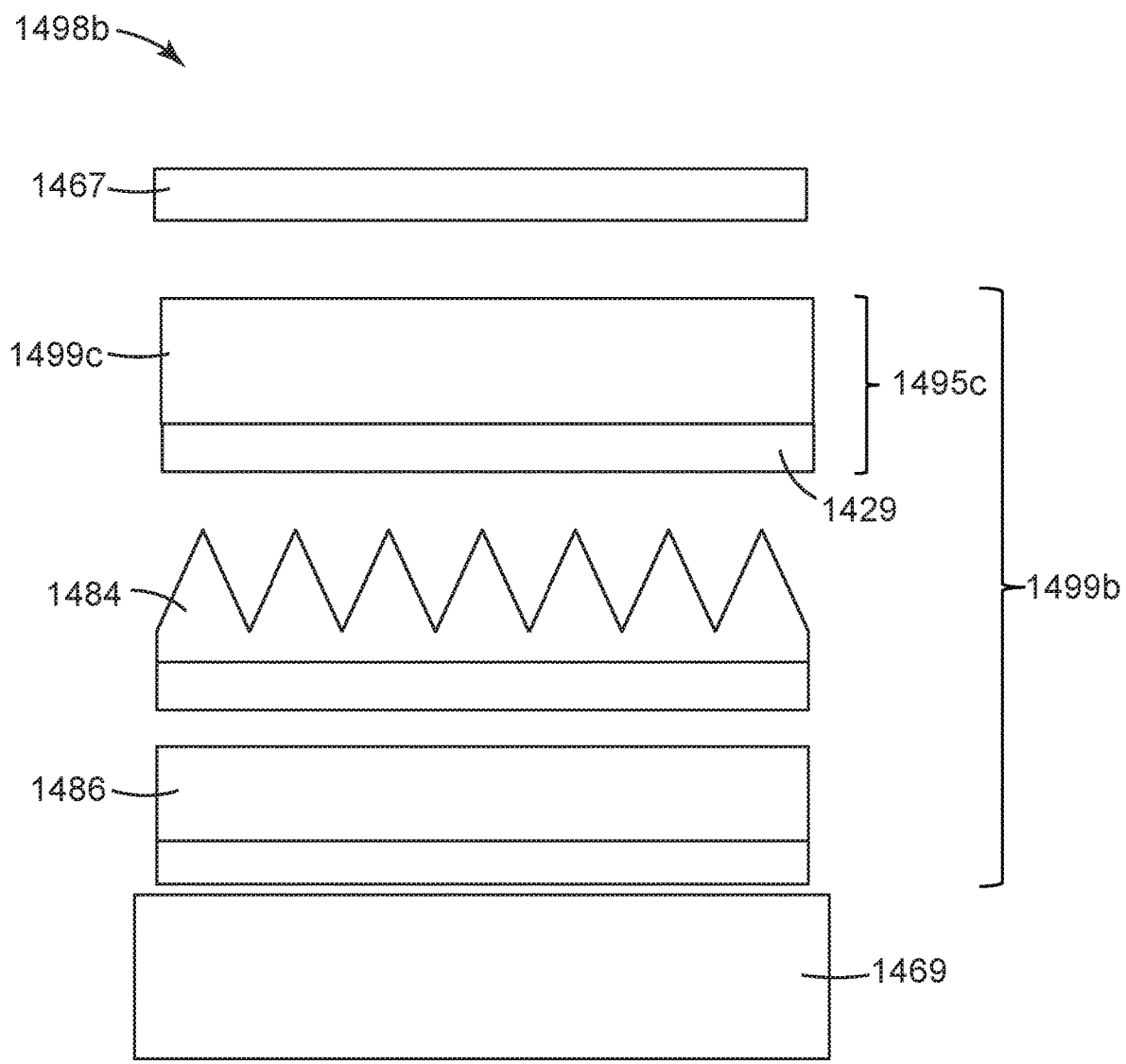

In some embodiments, a louver film may be included in optical stack 1499. The louver film may be included, for example, between the grating assembly 1400 and the reflective polarizer 1429. FIG. 14B is a schematic cross-sectional view of display system 1498b which corresponds to display system 1498 except that the optical stack 1499 has been replaced with optical stack 1499b which includes a first optical stack 1495c which includes reflective polarizer 1429 and a second optical stack 1499c. The second optical stack 1499c may be any of the optical stacks described elsewhere herein that includes a louver film and a grating assembly, for example. Optical stack 1499c may be oriented with the grating assembly facing the liquid crystal display panel 1467 and the louver film disposed between the grating assembly and the reflective polarizer 1429. Optical stack 1499c may correspond, for example, to any of optical stacks 1599, 1699 or 1799 which are described elsewhere herein.

Figure 15:
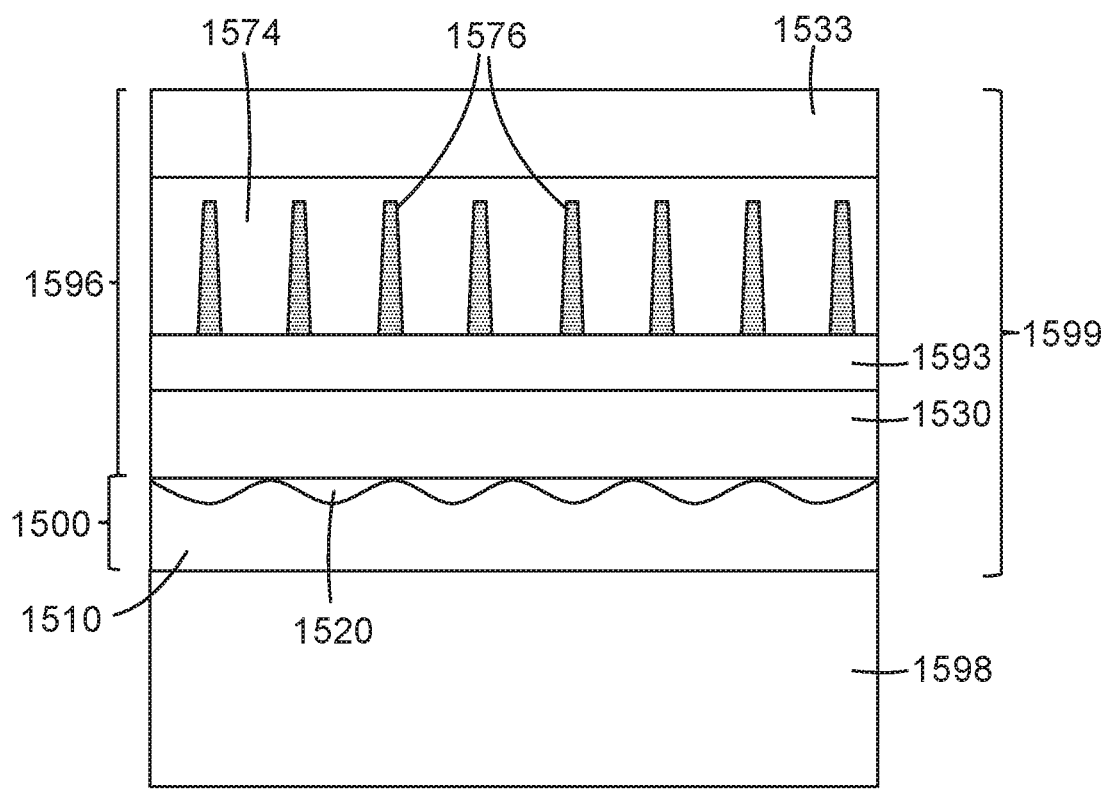
FIG. 15 is a cross-sectional view of an optical stack disposed on a display screen.

FIG. 15 is a cross-sectional view of optical stack 1599 adhered to a surface (e.g., outer surface of display glass) of display 1598. Optical stack 1599 includes grating assembly 1500 adhered to louver film 1596. Louver film 1596 may be adapted to limit viewing angles so that only viewers directly or nearly directly in front of the display 1598 can view content on the display 1598. Such louver films may be referred to as light control films or privacy films. Suitable louver films include Advanced Light Control Films (ALCFs) available from 3M Company (St. Paul, Minn.). Other suitable louver films and methods of making louver films are described, for example, in U.S. Pat. No. 8,213,082 (Gaides et al.) which is hereby incorporated herein by reference to the extent that it does not contradict the present description. Louver film 1596 can be made by molding a layer 1574 (using, for example, an ultraviolet (UV) curable material such as (meth)acrylate monomers, (meth)acrylate oligomers, or combinations thereof) against a substrate 1533 (which may be, for example, a polymeric substrate such as a polyethylene terephthalate (PET) or polycarbonate (PC) substrate) with channels 1576 which are then filled with light absorptive material (such as, for example, a UV curable resin including carbon black, or another pigment or dye, or a combination thereof). An additional substrate 1530 can then be adhered to a major surface of the louver film 1596 opposite the substrate 1533 through adhesive layer 1593, which may be an optically clear adhesive. Substrates 1530 may be a polymeric substrate such as a PET or PC substrate, for example.

Grating assembly 1500 may be any of the grating assemblies described elsewhere herein. Grating assembly 1500 includes first layer 1510 and second layer 1520. First layer 1510 may be an adhesive layer (e.g., a viscoelastic or elastomeric adhesive layer), second layer 1520 may be another adhesive layer (e.g., another viscoelastic or elastomeric adhesive layer) or may be a cross-linked or soluble resin layer, for example. Grating assembly 1530 can be made, for example, by casting second layer 1520 onto third layer 1530 and curing against a tool to provide a structured surface in second layer 1520. First layer 1510 can then be coated onto second layer 1520. Additional grating assemblies and methods of making grating assemblies are described further elsewhere herein. Grating assembly 1500 may be adapted to produce a diffraction pattern which reduces moiré generated by optical interference between louver film 1596 and display 1598. Optical stack 1599 may be an integral optical stack.

Figure 16:
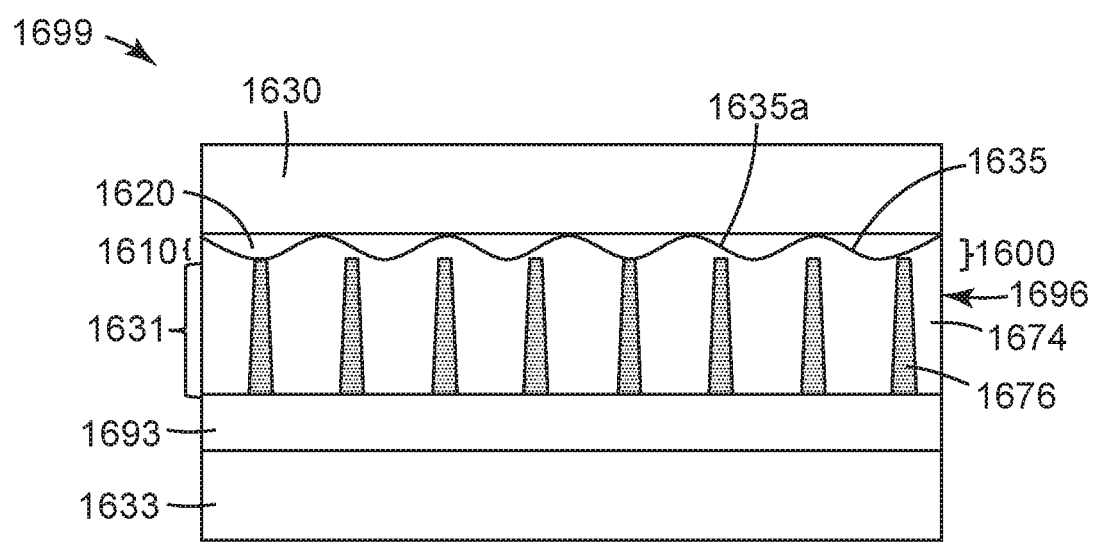
FIGS. 16-18 are cross-sectional views of optical stacks.

FIG. 16 is a cross-sectional view of optical stack 1699 which includes louver film 1696 and grating assembly 1600 formed integrally with louver film 1696. Grating assembly 1600 includes second layer 1620 and first layer 1610 which is an upper portion of layer 1674. An interface 1635 between first and second layers 1610 and 1620 defines a grating 1635a. Louver film 1696 includes layer 1674 and channels 1676 filled with an absorptive material. Louver film 1696 can also be described as including periodically varying optical film layer 1631, which includes a lower portion of layer 1674, and first layer 1610 which includes an upper portion of layer 1674. First layer 1610 and layer 1674 are monolithic. Optical stack 1699 may be described as comprising a louver film 1696 and a grating 1635a adjacent the louver film 1696.

Optical stack 1699 can be formed, for example, by casting and curing second layer 1620 onto substrate 1630 which may be a polymeric substrate such as polycarbonate, for example. Next, layer 1674 with channels 1676 can be molded directly on second layer 1620 and then channels 1676 filled with an absorptive material. The resulting louver film 1696 may then optionally be attached to an additional substrate 1633 using an adhesive layer 1693. Optical stack 1699 may be an integral optical stack with each layer in the stack laminated to its neighboring layers.

Figure 17:
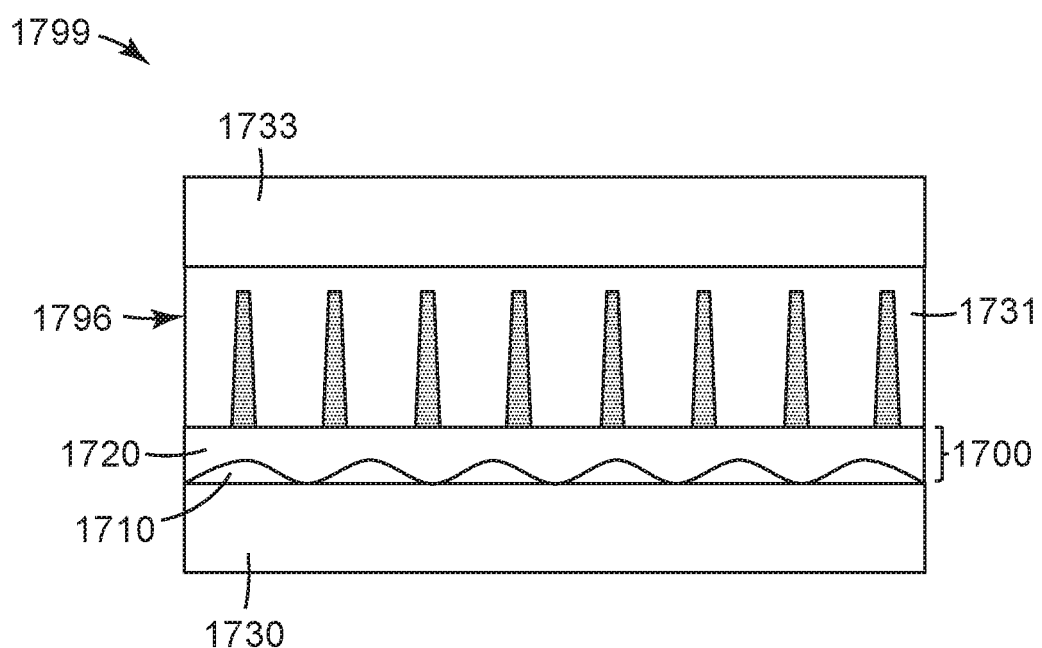

FIG. 17 is a cross-sectional view of optical stack 1799 including louver film 1796 and grating assembly 1700. Louver film 1796 includes substrate 1733 and periodically varying film layer 1731. Grating assembly 1700 is disposed on substrate 1730 and includes first and second layers 1710 and 1720. Grating assembly 1700 can be made, for example, by casting and curing first layer 1710 against substrate 1730 and then coating first layer 1710 with second layer 1720. Second layer 1720 may be an adhesive, such as a viscoelastic or elastomeric adhesive, which may be used to attach grating assembly 1700 to louver film 1796.

In some embodiments, it may be desired to adhere the grating assembly along with a periodically varying optical film, such as a privacy film, to a surface of a display. For example, an optical stack including a grating assembly and a louver film may be adhered to an outer glass surface of a display in order to provide a desired degree of privacy. In some embodiments, such optical stacks may be provided without including an additional substrate that would not ordinarily be included with the periodically varying optical stack in the absence of the grating assembly. For example, louver films typically include a substrate on each side of the louver layer. The optical stacks 1599, 1699 and 1799 include a grating assembly with a louver film without adding an additional substrate.

Figure 18:
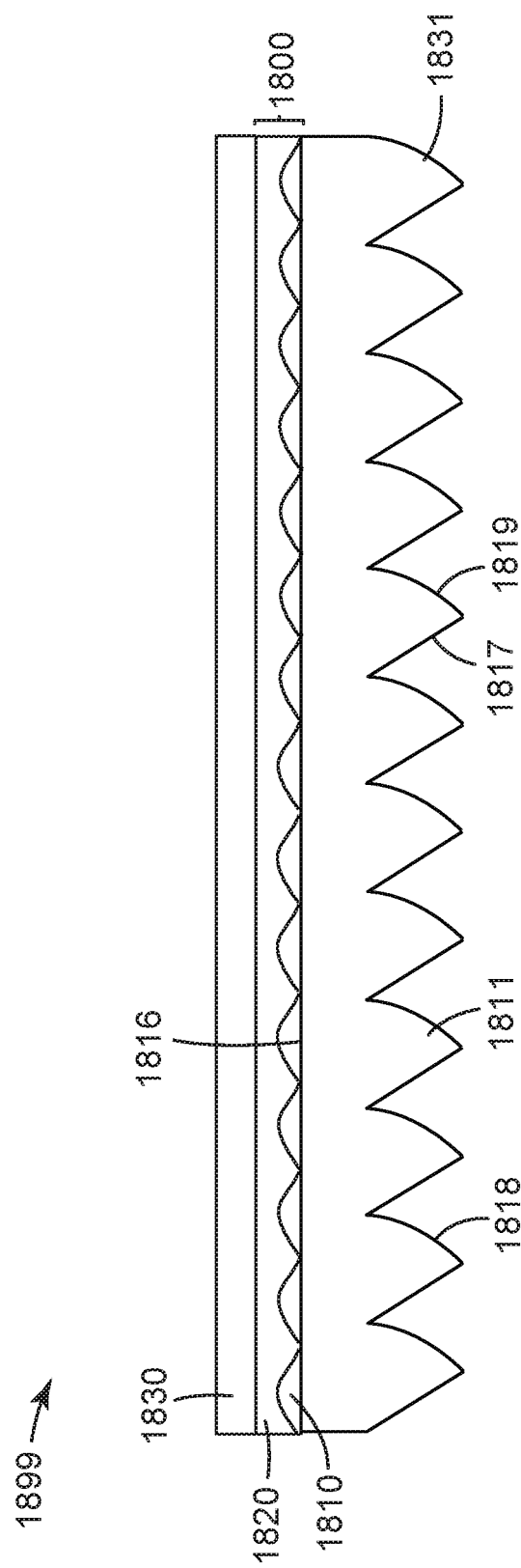

In some embodiments, a switchable privacy effect may be obtained by utilizing an asymmetric turning film as the periodically varying optical film. FIG. 18 is a cross-sectional view of optical stack 1899 including grating assembly 1800 and periodically varying optical film 1831, which in the illustrated embodiment is an asymmetric turning film including major surface 1818 including a plurality of microstructures 1811, each having a first face 1817 and a second face 1819. Periodically varying optical film layer 1831 also includes an opposing major surface 1816, which in the illustrated embodiment is substantially planar and is immediately adjacent a substantially planar surface of the first layer 1810 of the grating assembly 1800. First and second faces 1817 and 1819 have different shapes. In the illustrated embodiments, first face 1817 has a substantially flat shape and second face 1819 has a substantially curved shape. In other embodiments, different shapes may be used. For example, second face 1819 may include two or more flat shapes instead of a smoothly curving shape. The grating assembly 1800 may be configured to reduce moiré that could occur when periodically varying optical film 1831 is used in display applications.

Periodically varying optical film 1831 may be any suitable thickness and may be made from any suitable material. In some embodiments, periodically varying optical film 1831 may be formed from a polymeric material, such as polycarbonate, polyethylene terephthalate, polyethylene naphthalate, poly(methyl methacrylate) and copolymers and blends of the same. In some embodiments, periodically varying optical film 1831 may be optically transparent or have low haze and high clarity to avoid undesirably scattering incident light. In some embodiments, the periodically varying optical film 1831 may have a sufficiently high index of refraction, such as 1.5 or greater, to ensure that total internal reflection occurs at a sufficiently broad range of angles. Other appropriate materials include acrylics, polystyrenes, methyl styrenes, acrylates, polypropylenes, polyvinyl chlorides, and the like. In some embodiments the material, dimensions, or both of periodically varying optical film 1831 may be selected in order to produce a flexible film.

Each of microstructures 1811 may be linear microstructures; that is, microstructures 1811 may extend along a direction with substantially the same or identically the same cross-sectional shape (in the exemplary configuration of FIG. 18, along the axis into/out of the page). Microstructures 1811 may be formed through any suitable process, such as a microreplication process. For example, structured major surface 1818 may be formed through cutting (fly cutting, thread cutting, diamond turning or the like) a suitable tool with the negative of the desired structure and pressing a compliant but curable or hardenable material against the tool surface. The material may be subsequently hardened or cured (for example, through exposure to light such as ultraviolet light), leaving structured major surface 1818 with the desired features. Other processes may be possible, including casting and curing with an electroplated, laser cut, or etched tool, using photolithography such as two-photon mastering of a tool in conjunction with a cast and cure process, or even direct machining or an additive three-dimensional printing process. Microstructures 1811 may all be the same or they may different. For example, microstructures 1811 may change shape, size, rotation, or pitch along one or more portions of periodically varying optical film 1831. In some embodiments, microstructures 1811 are spatially variant, and in some embodiments there may be discrete portions of microstructures 1811 having similar characteristics, but different characteristics from neighboring portions of periodically varying optical film 1831. Additional suitable asymmetric turning films that may be used as periodically varying film 1831 are described in PCT Publication No. WO 2015/153329 (Johnson et al.) which is hereby incorporated herein by reference to the extent that it does not contradict the present description.

Grating assembly 1800 includes first and second layers 1810 and 1820 with a periodically structured interface therebetween. The structured interface can have any of the geometries described elsewhere herein. In some embodiments, each of the first and second layers 1810 and 1820 may be selected from the group consisting of viscoelastic or elastomeric adhesive layers, crosslinked resin layers, and soluble resin layers. In some embodiments, second layer 1820 is an adhesive layer and layer 1830 is a release liner which can be removed from grating assembly 1800 so that optical stack 1899 can be attached to a surface of a display. In some embodiments, optical stack 1899 integrally incorporates a grating assembly 1800 with a periodically varying optical film 1831 without adding any additional substrate layers.

Figure 19:
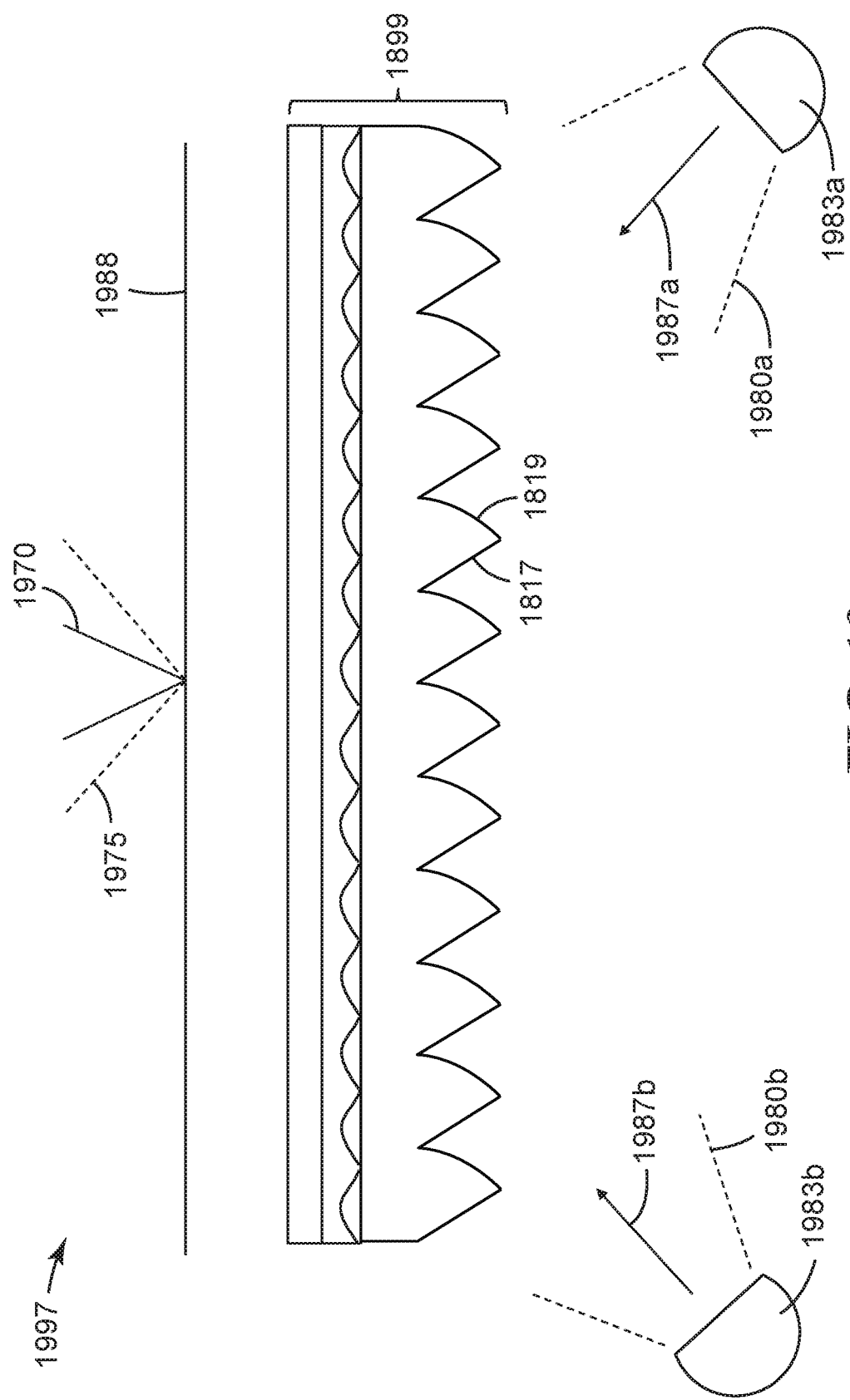
FIG. 19 is a schematic side view of an optical system including the optical stack of FIG. 18.

FIG. 19 is a schematic side view of optical system 1997 including optical stack 1899 of FIG. 18 and including first and second light sources 1983a and 1983b. First light source 1983a outputs a light distribution 1980a oriented along direction 1987a and second light source 1983b outputs a light distribution 1980b oriented along direction 1987b which is different from direction 1987a. Light from the first light source 1983a is preferentially reflected by the first face 1817 but not the second face 1819, and light from the second light source 1983b is preferentially reflected by the second face 1819 but not the first face 1817. For example, light from the first light source 1983a may be preferentially transmitted through second face 1819 and then reflected from first face 1817, and similarly, light from the second light source 1983b may be preferentially transmitted through first face 1817 and then reflected from second face 1819. Optical system 1997 includes a display surface 1988, which may be an outer surface of a display panel, for example, and may have two display modes. In the first mode, the display surface 1988 emits light having a first characteristic set of viewing angles as indicated by first light output distribution 1970, and in the second mode the display surface 1988 emits light having a second characteristic set of viewing angles as indicated by second light output distribution 1975. The first characteristic set of viewing angles and the second characteristic set of viewing angles may have different widths as indicated by first and second light output distributions 1970 and 1975. The first mode produces a relatively narrow light output distribution 1970 and may be described as a privacy mode, and the second mode produces a relatively broad light output distribution 1975 and may be described as a sharing mode.

Displays including the optical systems described herein, such as optical system 1997, may contain additional conventional display components such as polarizers (absorbing and/or reflective), and a liquid crystal (LC) panel including pixels and having subpixels that may correspond to different colors, such as red, green, and blue. For example, an asymmetric turning film may be laminated to or disposed next to one of the polarizers. Luminaires and lamps including the display may also include any suitable optical components or films, including additional turning films (asymmetric or symmetric), brightness enhancing films, diffusers, color filters, reflectors, polarizers and the like.

Figure 20:
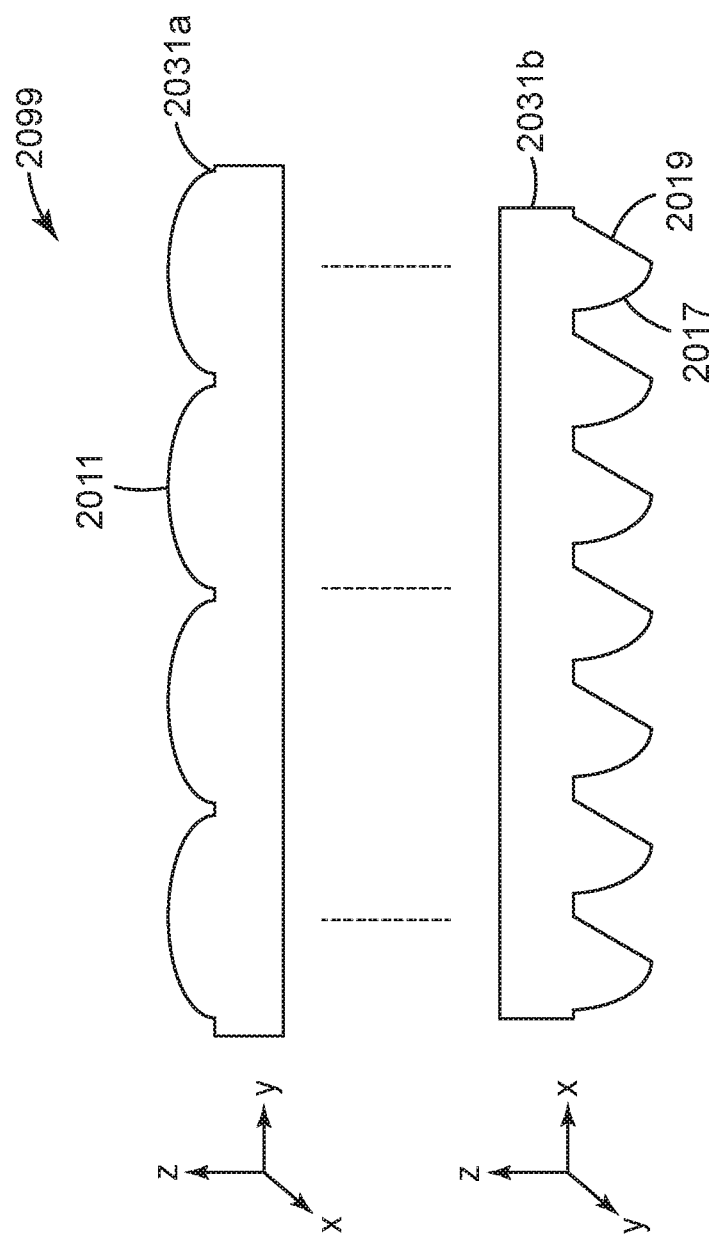
FIG. 20 is a split front-side elevation cross-section of an optical stack.

Other examples of optical stacks that can incorporate a grating assembly of the present description include recycling turning films such as those described in International Application No. PCT/US2016/028766 (Boyd et al.) which is hereby incorporated herein by reference to the extent that it does not contradict the present description. FIG. 20 is a split front-side elevation cross-section of an exemplary optical stack. Optical stack 2099 includes top structured surface 2031a with microstructure 2011, and bottom structured surface 2031b with microstructures with first face 2017 and second face 2019. Any of the grating assemblies of the present description may be include in optical stack 2099 between the top structured surface 2031a and the bottom structured surface 2031b.

In FIG. 20, the structured surfaces (top structured surface 2031a and bottom structured surface 2031b) are disposed such that a length direction of the microstructures are generally not parallel. In some embodiments, the length direction of the microstructures are oriented orthogonally from one another. However, in order to more easily depict a simultaneous cross-section of both the top and bottom structured surfaces, FIG. 20 (along with other figures in this application so-annotated) are split front-side elevation cross-sections; that is, as the reference coordinate systems to the left of each structured surface suggest, the figures are actually two perspectives spliced together. The orientation of other components in reference to these structured surfaces is described as is necessary.

Top structured surface 2031a includes microstructure 2011. In some embodiments, the structured top surface includes a plurality of parallel microstructures. In some embodiments, the parallel microstructures may be linear microstructures. By linear, it is meant that a peak of one of the microstructures is a line across the top structured surface (when viewed, for example, from a top plan view). In some embodiments, and for practical reasons including the limits of manufacturing processes, linear microstructures may include small deviations from precisely linear. In some embodiments, the microstructures may be linear but for a periodic or nonperiodic variation in pitch. In some embodiments, the microstructures may be linear but may vary in height, either periodically or nonperiodically. In some embodiments, there may be space or "land" between adjacent microstructures. In some embodiments, top structured surface 2011 includes spacing between adjacent microstructures in a range from about 0.5 micrometers to about 5 micrometers. The spacing may be constant or varying.

Microstructure 2011 may be substantially curved. In some embodiments, microstructure 2011 has a substantially cylindrical or semi-cylindrical shape. In some embodiments, microstructure 2011 is a semi-circle or a semi-ellipse along a cross-section orthogonal to the length of the microstructure. In some embodiments, microstructure 2011 is characterized by a height h, measured from the peak of microstructure 2011 to the base of microstructure 2011, along a line orthogonal to the base of microstructure 2011. The lowest points on top structured surface 2031a may be used to determine the base of microstructure 2011. Microstructure 2011 may also be characterized by a radius of curvature R, and the ratio of h/R may be any suitable value. In some embodiments, h/R is not greater than 0.4.

Top structured surface 2031a may be formed from any suitable method and from any suitable material. For example, top structured surface 2031a may be selectively etched or ground. In some embodiments, top structured surface 2031a may be formed at least in part through a two-photon mastering process. In some embodiments, top structured surface 2031a relies on a cast-and-cure process utilizing an inversely shaped tool. In some cases, top structured surface may be formed from a UV-crosslinkable or UV-curable resin such that appropriate light exposure causes the resin to harden, separate from the mold or tool, and permanently retain its shape. In some embodiments, top structured surface 2031a may be formed through an additive process, such as 3D-printing. In some embodiments, top structured surface 2031a may be injection molded. Top structured surface 2031a may be formed in a monolithic piece of material or it may be formed in a top layer of material disposed on a substrate or a dimensionally stable or warp resistant layer. The material or materials may be selected for their material, physical, or optical properties, such as clarity, scratch or abrasion resistance, warp resistance, birefringence or lack thereof, ability to be microreplicated in, haze, Tg (glass transition temperature), potential to be bonded to other surfaces, or any other suitable characteristic.

Bottom structured surface 2031b includes microstructures, each with first face 2017 and second face 2019. As for top structured surface 2031a, the microstructures may be linear microstructures; however, recall that the perspective is split in FIG. 20, such that in the exemplary configuration shown in this figure, the microstructures of the top and bottom structures run generally orthogonally to one another. Bottom structured surface 2031b may include spaced apart adjacent structures, with a spacing being—in some embodiments—between 0.5 micrometers and 3 micrometers.

First face 2019 is substantially flat, in that from a cross-section orthogonal to the length of the microstructure, it appears as a straight line. Second face 2017 is curved, in that from a cross-section orthogonal to the length of the microstructure, it appears as an arc or curve. In some embodiments, the microstructures may include more than two faces, or two faces and a peak or joining portion, for example. In some embodiments, second face 2017 may have a constant curvature, or it may have a piecewise curvature. In some embodiments, second face 2017 may have a continuously varying curvature. In some embodiments, each first face may be the same or substantially the same shape and size. In some embodiments, each second face may be the same or substantially the same shape and size. In some embodiments, one or more of the first and second faces may vary in one or more of shape or size, either periodically, non-periodically, or in a gradient.

Optical stack 2099 may be, overall, formed from any suitable material or combination of materials and have any suitable dimensions. In some embodiments, optical stack 2099 may be sized or shaped for the particular display or lighting application. The structures on the structured surfaces of optical stack 2099 may run orthogonally as described, or they may extend or run simply in a first direction and a second direction, where the first direction and the second direction are different from one another. For example, an angle between the first and second direction may be between 78 and 90 degrees. In some embodiments, the top structured surface and the bottom structured surface cover the same area. In some embodiments, the two structured surfaces or their respective substrates are laminated to or attached to each other with a grating assembly of the present description included between the first and second structured surfaces 2031a and 2031b.

Grating assemblies used in any of the optical stacks, polarizer stacks, or optical systems of the present description may include one, two, three or more layers. In some embodiments each layer of the grating assemblies may be selected from the group consisting of viscoelastic or elastomeric adhesive layers, crosslinked resin layers, and soluble resin layers. In other embodiments, other materials may be used in the grating assemblies.

Figure 1:
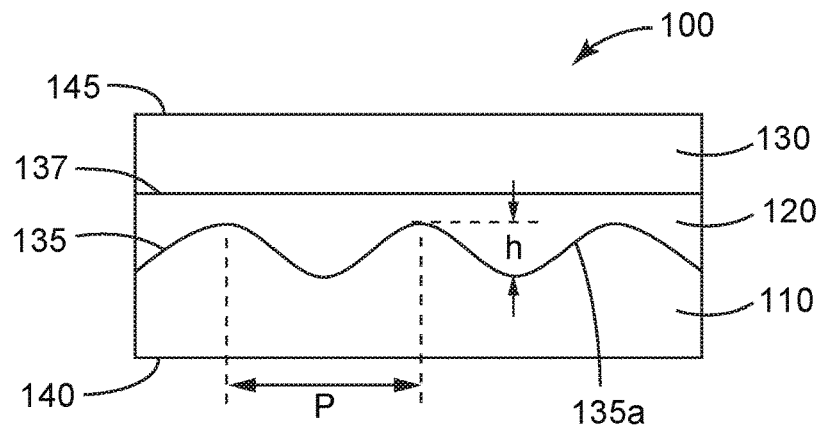
FIG. 1 is a cross-sectional view of a grating assembly.

A grating assembly according to the present description is shown in FIG. 1. Grating assembly 100 includes a first layer 110, a second layer 120 immediately adjacent first layer 110, and a third layer 130 immediately adjacent second layer 120 opposite first layer 110. In some embodiments, first layer 110 is a first viscoelastic or elastomeric adhesive layer, second layer 120 is a crosslinked or soluble resin layer and third layer 130 is a second viscoelastic or elastomeric adhesive layer. Grating assembly 100 may be used in place of any of the grating assemblies of the present description. For example, the two layer grating assembly 1300 can be replaced by the three layer grating assembly 100.

Viscoelastic or elastomeric adhesives may be pressure-sensitive adhesives (PSAs), rubber-based adhesives (e.g., rubber, urethane) and silicone-based adhesives. Viscoelastic or elastomeric adhesives also include heat-activated adhesives which are non-tacky at room temperature but become temporarily tacky and are capable of bonding to a substrate at elevated temperatures. Heat activated adhesives are activated at an activation temperature and above this temperature have similar viscoelastic characteristics as PSAs. Viscoelastic or elastomeric adhesives may be substantially transparent and optically clear. Any of the viscoelastic or elastomeric adhesives of the present description may be viscoelastic optically clear adhesives. Elastomeric materials may have an elongation at break of greater than about 20 percent, or greater than about 50 percent, or greater than about 100 percent. Viscoelastic or elastomeric adhesive layers may be applied directly as a substantially 100 percent solids adhesive or may be formed by coating a solvent-borne adhesive and evaporating the solvent. Viscoelastic or elastomeric adhesives may be hot melt adhesives which may be melted, applied in the melted form and then cooled to form a viscoelastic or elastomeric adhesive layer.

Suitable viscoelastic or elastomeric adhesives include elastomeric polyurethane or silicone adhesives and the viscoelastic optically clear adhesives CEF22, 817x, and 818x, all available from 3M Company, St. Paul, Minn. Other useful viscoelastic or elastomeric adhesives include PSAs based on styrene block copolymers, (meth)acrylic block copolymers, polyvinyl ethers, polyolefins, and poly(meth) acrylates.

Crosslinked or soluble resins may be used in multilayer optical adhesives of the present description. Crosslinkable or curable resins may be deposited or coated onto a surface in liquid form and then the coating cured, for example, by applying actinic radiation or heat, to form a crosslinked resin layer. The actinic radiation used to cure the coating of curable resin may be e-beam or ultraviolet (UV) radiation. Crosslinking a coated resin in this way can result in a layer with low or substantially no birefringence.

Suitable curable resins for use in optical adhesives of the present description include UV-curable acrylates, such as such as polymethyl methacrylate (PMMA), aliphatic urethane diacrylates (such as Photomer 6210, available from Sartomer Americas, Exton, Pa.), epoxy acrylates (such as CN-120, also available from Sartomer Americas), and phenoxyethyl acrylate (available from Sigma-Aldrich Chemical Company, Milwaukee, Wis.). Other suitable curable resins include moisture cured resins such as Primer M available from MAPEI Americas (Deerfield Beach, Fla.). Additional suitable viscoelastic or elastomeric adhesives and additional suitable crosslinkable resins are described in U.S. Pat. App. Pub. No. 2013/0011608 (Wolk et al.).

As used herein, a "soluble resin" is a resin having the material property that it is soluble in a solvent that is suitable for use in a web coating process. In some embodiments, soluble resins are soluble to at least 3 weight percent, or at least 5 weight percent, or at least 10 weight percent or at least 20 weight percent or at least 50 weight percent at 25° C. in at least one of methyl ethyl ketone (MEK), toluene, ethyl acetate, acetone, methanol, ethanol, isopropanol, 1,3 dioxolane, tetrahydrofuran (THF), water and combinations thereof. A soluble resin layer may be formed by coating a solvent-borne soluble resin and evaporating the solvent. Soluble resin layers may have low or substantially no birefringence. Suitable soluble resins include VITEL 1200B available from Bostik, Inc. (Wauwatosa, Wis.), PRIPOL 1006 available from Croda USA (New Castle, Del.), and soluble aziridine resins as described, for example, in U.S. Pat. No. 5,534,391 (Wang).

An interface 135 between the first layer 110 and the second layer 120 is structured and defines a grating 135a. Interface 135 is configured to provide a desired optical effect. For example, the geometry of the interface and the index contrast across interface 135 (i.e., the absolute value of the difference in refractive index of materials on either side of interface 135) can be chosen so that a least a portion of light incident on interface 135 is refracted or diffracted by interface 135. First layer 110 may have a first refractive index $n_1$, second layer 120 may have a second refractive index $n_2$ which may be different from the first refractive index $n_1$, and third layer 130 may have a third refractive index $n_3$.

The index contrast across a structured interface in any of the embodiments of the present description may be selected to achieve a desired optical effect, such as moiré reduction. In any of the embodiments of the present description, the magnitude (i.e., absolute value) of the difference between the refractive indices of the materials on either side of any structured interface (i.e., the refractive index contrast across the interface) may be at least 0.001 or at least 0.003 or at least 0.005 or at least 0.008 or at least 0.01. In some embodiments, the refractive index contrast may be less than about 0.5 or less than about 0.4 or less than about 0.2. In some embodiments, the refractive index contrast across an interface is at least 0.001 and less than about 0.5. In the embodiment shown in FIG. 1, the magnitude of the difference between the refractive indices of the materials on either side of interface 135 (i.e., the refractive index contrast of interface 135) is given by $|n_1-n_2|$. In some embodiments, interface 135 defines a grating 135a having a peak to valley height of h and a pitch of P. An interface between two transparent or semi-transparent materials may be said to define a grating if the interface has a periodic or quasi-periodic structure that provides at least some diffraction of a visible light incident on the interface.

Any of the layers of the grating assemblies or the optical stacks of the present description may contain fillers, such as inorganic nanoparticles, to adjust the refractive index of the layer. For example, first layer 110 and/or third layer 130 may be viscoelastic or elastomeric adhesive layers having nanoparticles disbursed in the adhesive. Similarly, second layer 120 may be a crosslinked or coatable resin layer that contains inorganic nanoparticles. Suitable nanoparticles include zirconia nanoparticles. The nanoparticles may have a volume-average diameter in the range of about 1 nm to about 50 nm or in a range of about 2 nm to about 25 nm. Additional suitable nanoparticles are described in U.S. Pat. App. Pub. No. 2013/0338251 (Joly et al.). The refractive index of such layers may be greater than about 1.55, or greater than about 1.6, or greater than about 1.65, for example. The second layer 120 may be an ultra low index (ULI) layer; for example, a nanovoided ULI layer as described in U.S. Pat. App. Pub. No. 2012/0038990 (Hao et al.). Such ULI layers may have a refractive index less than about 1.35 or less than about 1.3, or less than about 1.25, or less than about 1.2, or less than about 1.15.

For any of the embodiments discussed herein, the pitch for any grating may be greater than about 1 micrometer, or greater than about 2 micrometers, or greater than about 4 micrometers or greater than about 6 micrometers and may be less than about 60 micrometers, or less than about 50 micrometers, or less than about 40 micrometers or less than about 30 micrometers. For example, in some embodiments the pitch is between about 2 micrometers and about 50 micrometers or between about 4 micrometers and about 40 micrometers.

The pitch and height may be chosen to produce diffraction and/or refraction of at least a portion of a light incident on the grating. In some embodiments, the grating assemblies of the present description may be used with a periodically varying optical film layer in a display in order to reduce moiré caused by the interaction of the periodically varying optical film layer and the display.

Interface 137 between the second layer 120 and the third layer 130 may be unstructured (i.e., substantially flat) as illustrated in FIG. 1 or may be structured to provide an optical effect as discussed further elsewhere herein.

Grating assembly 100 may be an adhesive article that can be used to attach a periodically varying film, such as a privacy film, for example, to a display panel. In some embodiments, interface 135 and/or interface 137 are configured to provide a diffraction effect that reduces moiré when grating assembly 100 is attached to a cover glass and/or a display panel.

First layer 110 includes outer major surface 140 and third layer 130 includes outer major surface 145. In some embodiments, grating assembly 100 is provided with a first release film immediately adjacent outer major surface 140 and/or a second release film immediately adjacent outer major surface 145. The first and second release films are sacrificial films that are intended to be removed prior to use of grating assembly 100 in a display. A release film having a release surface may be included with any of the multilayer optical adhesives of the present description with the release surface immediately adjacent an outer major surface of a viscoelastic or elastomeric adhesive layer. The release film may provide a structure so that when the release film is removed, the structured outer surface of the viscoelastic or elastomeric adhesive layer is structured to provide channels for air bleed. In some embodiments, the viscoelastic or elastomeric adhesive layer can wet out a surface in order to eliminate the channels after the layer is attached to the surface. Suitable adhesives and air bleed structures are described, for example, in U.S. Pat. App. Pub. No. 2007/0212535 (Sherman el al.).

In any of the embodiments described herein a layer disposed between two viscoelastic or elastomeric adhesive layers may have a land thickness (i.e., the thickness excluding the heights of the structures) of less than 25 micrometers, or less than 20 micrometers, or less than 15 micrometers, or less than 10 micrometers. In some embodiments, the land thickness is greater than about 1 micrometer, or greater than about 3 micrometers or greater than about 5 micrometers. Using a layer having a land thickness less than 25 micrometers could not readily be achieved with conventional techniques when the layer is a carrier film, since a carrier film typically has a thickness 50 micrometers or greater so that the carrier film is self-supporting. Thus the multilayer optical adhesives of the present description provide a structured article with a low thickness and with no optical artifacts associated with a carrier film, which cannot be achieved using conventional techniques.

In any of the embodiments described herein, each layer of the grating assembly may be substantially transmissive. For example, first layer 110 of grating assembly 100 may be a first viscoelastic or elastomeric adhesive layer, second layer 120 may be a first crosslinked or soluble resin layer and third layer 130 may be the second viscoelastic or elastomeric adhesive layer, and each of the first viscoelastic or elastomeric adhesive layer, the first crosslinked or soluble resin layer and the second viscoelastic or elastomeric adhesive layer may be substantially transmissive.

A layer may be described as substantially transmissive if it has the material property that substantially all visible light propagating through the layer is either transmitted through the layer or reflected at an interface at a boundary of the layer. In some embodiments, more than 95% or more than 97% of light having a wavelength of 550 nm and incident on the layer is transmitted through the layer or reflected from an interface at a boundary of the layer.

Figure 2A:
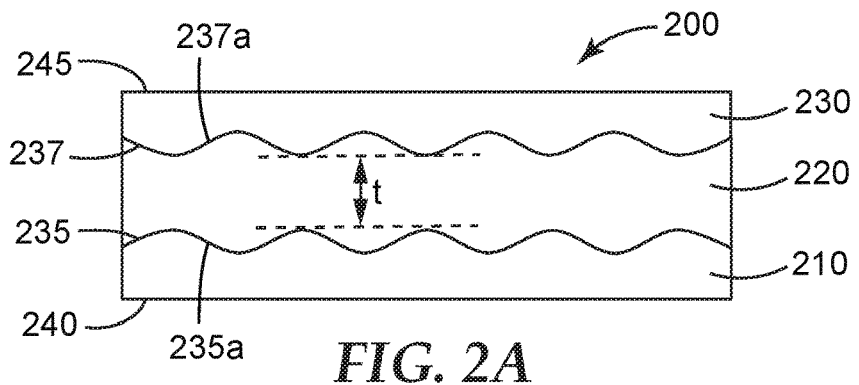
FIG. 2A is a cross-sectional view of a grating assembly.

An embodiment in which two structured interfaces are present in a grating assembly of the present description is illustrated in FIG. 2A. Grating assembly 200 includes a first layer 210, a second layer 220 immediately adjacent first layer 210, and a third layer 230 immediately adjacent second layer 220 opposite first layer 210. In some embodiments, first layer 210 is a first viscoelastic or elastomeric adhesive layer, second layer 220 is a crosslinked or soluble resin layer and third layer 230 is a second viscoelastic or elastomeric adhesive layer.

First layer 210 includes outer major surface 240 and third layer 230 includes outer major surface 245. In some embodiments, grating assembly 200 is provided with a first release film immediately adjacent outer major surface 240 and/or a second release film immediately adjacent outer major surface 245.

Grating assembly 200 includes a structured first interface 235 between first layer 210 and second layer 220 and a structured second interface 237 between second layer 220 and third layer 230. First interface 235 defines a first grating 235a and second interface 237 defines a second grating 237a. In some embodiments, the first grating 235a extends in a first direction and the second grating 237a extends in a second direction different from the first direction.

Second layer 220 has a land thickness (i.e., a thickness excluding the heights of the structures) of t. In some embodiments, the land thickness t is less than 25 micrometers (or less than 20 micrometers or less than 15 micrometers or less than 10 micrometers). In some embodiments, the land thickness t is greater than about 1 micrometer, or greater than about 3 micrometers or greater than about 5 micrometers.

Figure 2B:
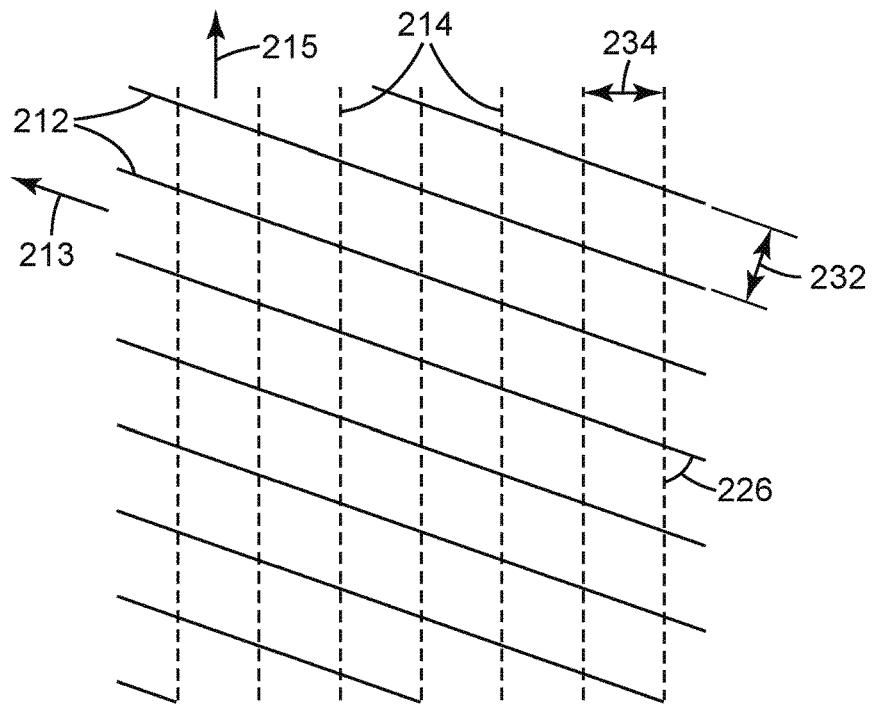
FIG. 2B is a schematic top perspective view of a grating assembly.

FIG. 2B shows a schematic top view of a grating assembly having a first grating represented by element 212 extending in first direction 213 and a second grating represented by element 214 extending in a second direction 215 with angle 226 between first direction 213 and second direction 215. The first grating represented by element 212 has a first pitch 232 and the second grating represented by element 214 has a second pitch 234. In many embodiments, second direction 215 is different from first direction 213. In some embodiments, angle 226 is greater than 0 degrees, or greater than about 5 degrees, or greater than about 10 degrees, or greater than about 20 degrees and less than or equal to 90 degrees. It will be understood than an angle greater than 90 degrees is equivalent to a complement angle less than 90 degrees. In some embodiments, first direction 213 and second direction 215 are substantially orthogonal. In some embodiments the first pitch 232 and the second pitch 234 are about equal. In other embodiments, the first pitch 232 and the second pitch 234 are different. In some embodiments, an optical stack including the grating assembly of FIG. 2B includes a periodically varying optical film layer with a pitch direction intermediate between first and second directions 213 and 215.

Figure 3:
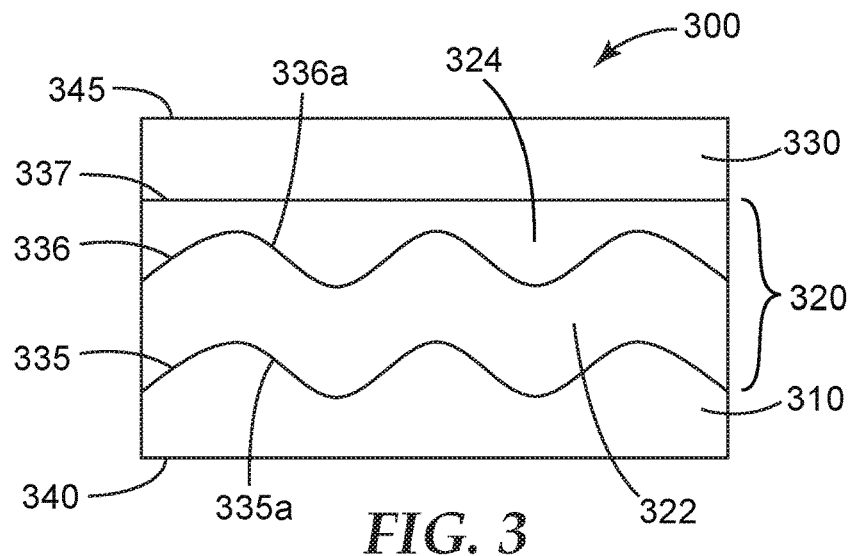
FIG. 3 is a cross-sectional view of a grating assembly.

Another embodiment in which two structured interfaces are present in a grating assembly of the present description is illustrated in FIG. 3. Grating assembly 300 includes a first layer 310, a second layer 320 immediately adjacent first layer 310, and a third layer 330 immediately adjacent second layer 320 opposite first layer 310. First layer 310 is a first viscoelastic or elastomeric adhesive layer, second layer 320 is a crosslinked or soluble resin layer and third layer 330 is a second viscoelastic or elastomeric adhesive layer. As used herein, a crosslinked or soluble resin layer may consist of one or more sublayers where each sublayer is a crosslinked or soluble resin layer and does not include any sublayer that is not a crosslinked or soluble resin layer. Second layer 320 includes first sublayer 322 immediately adjacent first layer 310, and second sublayer 324 immediately adjacent the first sublayer 322 and immediately adjacent third layer 330. Grating assembly 300 includes first interface 335 between first layer 310 and first sublayer 322, second interface 336 between first sublayer 322 and second sublayer 324, and third interface 337 between second sublayer 324 and third layer 330. In the illustrated embodiment, first interface 335 and second interface 336 are structured and define first and second gratings 335a and 336a, respectively, and third interface 337 is unstructured. In other embodiments, any one, two or all of the first, second and third interfaces 335, 336 and 337 are structured.

First layer 310 includes outer major surface 340 and third layer 330 includes outer major surface 345. In some embodiments, grating assembly 300 is provided with a first release film immediately adjacent outer major surface 340 and/or a second release film immediately adjacent outer major surface 345.

Figure 4:
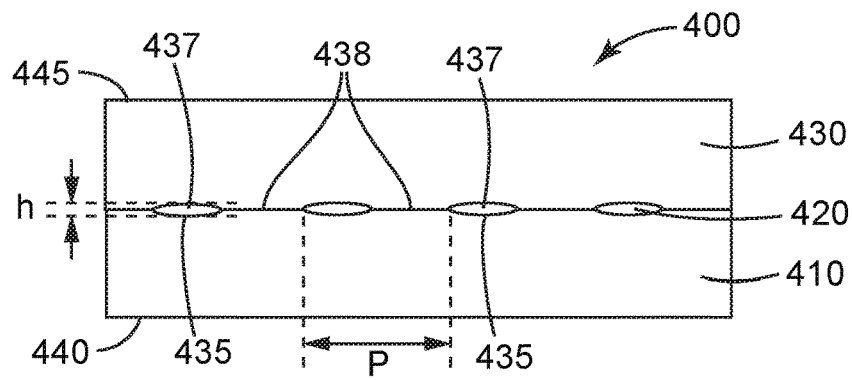
FIG. 4 is a cross-sectional view of a grating assembly.

In some embodiments, one or more layers of a grating assembly are discontinuous as illustrated in FIG. 4. Grating assembly 400 includes a first layer 410, a second layer 420 immediately adjacent first layer 410, and a third layer 430 immediately adjacent second layer 420 opposite first layer 410. Third layer 430 is in contact with first layer 410. In some embodiments, first layer 410 is a first viscoelastic or elastomeric adhesive layer, second layer 420 is a crosslinked or soluble resin layer and third layer 430 is a second viscoelastic or elastomeric adhesive layer. Second layer 420 is discontinuous. Grating assembly 400 includes a first major surface 440, a second major surface 445, a first interface 435 between the first layer 410 and the second layer 420, a second interface 437 between the second layer 420 and the third layer 430, and a third interface 438 between the first layer 410 and the third layer 430.

In some embodiments, the first, second and third interfaces, 435, 437, and 438, define a grating that diffracts at least a portion of a light incident on a major surface (440 or 445) of the grating assembly. The grating has a pitch P and a peak to valley height h. In some embodiments, first layer 410 has a first refractive index $n_1$, second layer 420 has a second refractive index $n_2$ different from $n_1$. In some embodiments, h multiplied by the absolute value of the refractive index between first layer 410 and second layer 420 (i.e., $h \times |n_1 - n_2|$) is in a range of about 150 nm to about 350 nm and the pitch, P, is in a range of about 2 micrometers to about 50 micrometers.

In some embodiments, third layer 430 is an additional layer that may be a viscoelastic or elastomeric adhesive layer or may be some other layer. In some embodiments, first layer 410 is a first viscoelastic or elastomeric adhesive layer, second layer 420 is a discontinuous layer and first layer 410 is adhered to a surface of a layer in a display with second layer 420 facing the surface. Third layer 430 may be a viscoelastic or elastomeric adhesive layer used to attach the grating assembly 400 to a periodically varying optical film as described elsewhere herein.

Second layer 420 may be applied to first layer 410 by ink jet printing, for example. In some embodiments, grating assembly 400 is made by providing first layer 410 with a structured surface. A solvent-borne resin may then be coated onto the structured surface and the solvent may then be evaporated producing in a partial filling of the structured surface which results in a discontinuous second layer 420. Third layer 430 may then be coated over the discontinuous second layer 420 and over the part of the structured surface in first layer 410 not covered by the discontinuous second layer 420. In some embodiments, second layer 420 is formed by printing a material onto an unstructured surface of first layer 410. The material may be a resin that diffuses into the surface of first layer 410 forming a second layer 420 that is discontinuous and located near the major surface of first layer 410 opposite first major surface 440.

Figure 5:
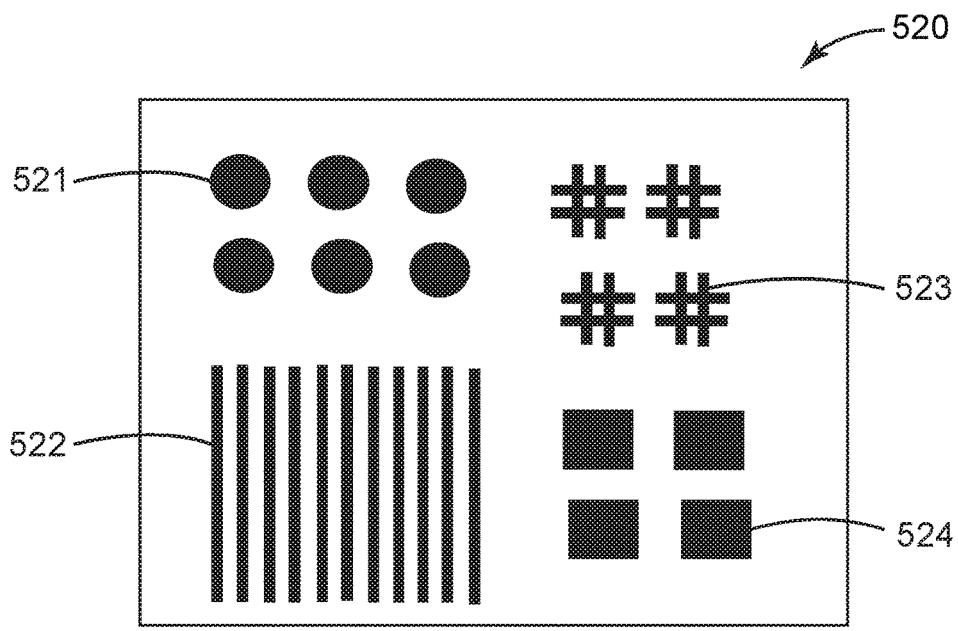
FIG. 5 is a schematic top perspective view of a discontinuous layer.

Second layer 420 may include a plurality of discrete objects in a pattern. The discrete objects may be dots, cross-hatches, ribs, pillow-shaped objects (deformed rectangular parallelepiped objects with tops bowed outward) or combinations thereof. FIG. 5 shows a cross-section view of a discontinuous second layer showing dots 521, ribs 522, cross-hatches 523 and rectangular parallelepipeds 524 which, in some embodiments, may have a domed outer surface.

Figure 6:
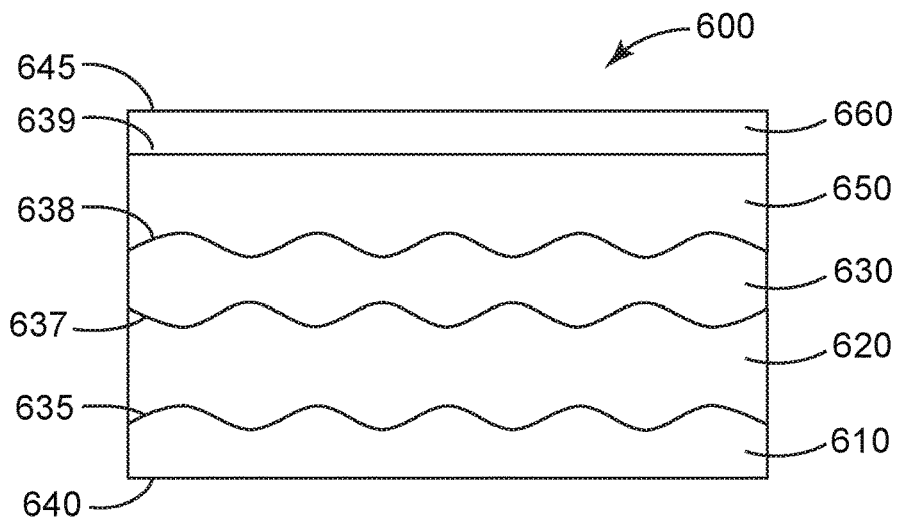
FIG. 6 is a cross-sectional view of a grating assembly.

Grating assemblies according to the present description may include more than three layers as illustrated in FIG. 6. Grating assembly 600 includes a first layer 610, a second layer 620 immediately adjacent first layer 610, a third layer 630 immediately adjacent second layer 620 opposite first layer 610, a fourth layer 650 immediately adjacent third layer 630 opposite second layer 620, and a fifth layer 660 immediately adjacent fourth layer 650 opposite third layer 630. In some embodiments, first layer 610 is a first viscoelastic or elastomeric adhesive layer, second layer 620 is a first crosslinked or soluble resin layer, third layer 630 is a second viscoelastic or elastomeric adhesive layer, fourth layer 650 is a second crosslinked or soluble resin layer, and fifth layer 660 is a third viscoelastic or elastomeric adhesive layer. Grating assembly 600 includes first interface 635 between first layer 610 and second layer 620, second interface 637 between second layer 620 and third layer 630, third interface 638 between third layer 630 and fourth layer 650, and fourth interface 639 between fourth layer 650 and fifth layer 660. Grating assembly 600 can be made by adhering an outer major surface 245 of a first grating assembly 200 of FIG. 2 to an outer major surface 240 of a second grating assembly 200. Grating assembly 600 can also be made layer by layer using the processes described elsewhere herein.

In some embodiments, at least two of the first, second, third and fourth interfaces 635, 637, 638, and 639 are structured and define gratings. In some embodiments, any one, two, three or all of the first, second, third and fourth interfaces 635, 637, 638, and 639 are structured and define gratings. In some embodiments, the first, second, third and fourth interfaces 635, 637, 638, and 639 define a first grating extending in a first direction and a second grating extending in a second direction different from the first direction.

First layer 610 includes outer major surface 640 and third layer 630 includes outer major surface 645. In some embodiments, grating assembly 600 is provided with a first release film immediately adjacent outer major surface 640 and/or a second release film immediately adjacent outer major surface 645 prior to incorporation into or onto a display or prior to being attached to a periodically varying optical film.

According to the present description, it has been discovered that grating assemblies useful for moiré reduction can be constructed from a first viscoelastic or elastomeric adhesive layer and a second viscoelastic or elastomeric adhesive layer where an interface between the two adhesives is structured and the interface is stable over time against heat and mechanical deformation.

Figure 7:
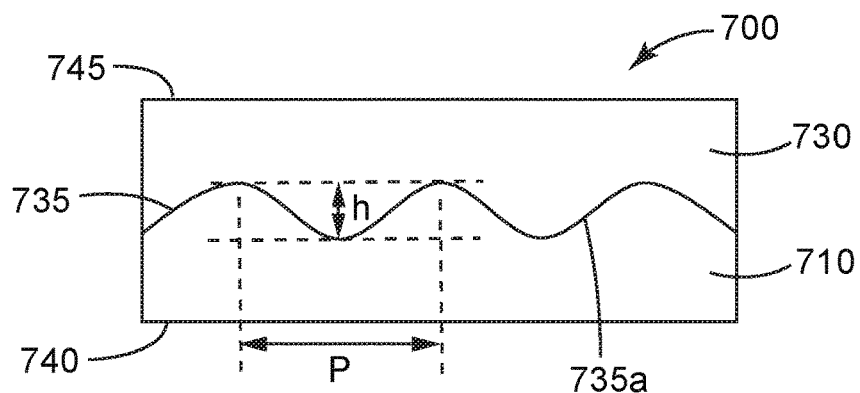
FIG. 7 is a cross-sectional view of a grating assembly.

A grating assembly according to the present description is shown in FIG. 7. Grating assembly 700 includes a first layer 710 and a second layer 730 immediately adjacent first layer 710. First layer 710 is a first viscoelastic or elastomeric adhesive layer having a first refractive index $n_1$ and second layer 730 is a second viscoelastic or elastomeric adhesive layer having a second refractive index $n_2$ different from $n_1$. Grating assembly 700 includes interface 735 which defines grating 735a. The grating may have a peak to valley height of h and a pitch of P. The peak to valley height, h, multiplied by the refractive index contrast across the grating, $|n_1-n_2|$, may be in the range of about 150 nm to about 350 nm and the pitch may be in a range of about 2 micrometers to about 50 micrometers. As discussed elsewhere herein, this range has been found to give good anti-moiré properties.

First layer 710 includes outer major surface 740 and third layer 730 includes outer major surface 745. In some embodiments, grating assembly 700 is provided with a first release film having a first release surface immediately adjacent outer major surface 740 and/or a second release film having a second release surface immediately adjacent outer major surface 745 prior to incorporation into an optical stack in a display.

In some embodiments of the grating assemblies of the present description, a plurality of particles or beads providing a controlled diffusion of light may be added to one or more of the layers. In embodiments where the grating assembly is used for moiré reduction, such beads can cause a pixel image to spread over an area larger than the pixel size when viewed through the grating assembly and this can help reduce moiré. In addition to reducing moiré, incorporating a plurality of particles or beads can reduce iridescence that may occur. When a grating assembly is included in a display, iridescence due to the frequency dependence of reflection of ambient light from the grating assembly can sometimes be observed. An anti-glare layer can significantly reduce such iridescence, but the iridescence may be objectionable in displays not incorporating an anti-glare layer. Incorporating particles into the grating assembly or in layers of an optical stack including the grating assembly allows the iridescence to be reduced or substantially eliminated. Particles may be incorporated into any of the layers of any of the grating assemblies or optical stacks described herein. The particles may be incorporated into a layer immediately adjacent a grating or the particles may be incorporated into a separate additional layer disposed proximate the grating layers. The separate additional layer may be a film with a substantially unstructured surface.

It has been found that particle sizes (i.e., mean diameters) in the range of about 0.5 micrometers to about 30 micrometers can be effective in producing the desired degree of spreading the pixel image and/or in producing the desired reduction in iridescence. As used herein, mean diameter refers to the number averaged or un-weighted mean unless indicated differently. In some embodiments, the mean diameter of the particles is greater than about 0.5 micrometers, or greater than about 1 micrometer or greater than about 2 micrometers and the mean diameter of the particles is less than about 30 micrometers, or less than about 20 micrometers or less than about 10 micrometers.

The absolute value of the refractive index difference between the particles and the medium in which they are located is herein denoted $|\Delta n|$. It has been found that $|\Delta n|$ in the range of about 0.001 to about 0.1 can be effective in producing the desired degree of spreading of a pixel image and/or in producing the desired reduction in iridescence. In some embodiments, $|\Delta n|$ is greater than about 0.001 or greater than about 0.003 and less than about 0.1 or less than about 0.05 or less than about 0.01. In some embodiments, $|\Delta n|$ is in a range of about 0.003 to about 0.007. For example, PMMA beads in CEF22 optically clear adhesive (available from 3M Company, St. Paul) gives a $|\Delta n|$ of about 0.005 at 532 nm (and about 0.004 at 405 nm and about 0.003 at 632 nm). The particles can be any particles having a size and refractive index in the desired range. The particles can have a spherical, ellipsoidal, irregular or other shape. Glass beads or polymeric beads may be used.

In some embodiments, the particles are substantially monodispersed. Substantially monodispersed particles may have a distribution of particle diameters such that 90 percent or more, or 95 percent or more, of the particles have a diameter within 5 percent or within 10 percent of the mean particle diameter. Substantially monodispersed particles may have a distribution of particle diameters having a coefficient of variation (standard deviation divided by mean times 100 percent) of less than about 10 percent, less than about 5 percent, or less than about 4 percent. Suitable substantially monodispersed particles include monodisperse PMMA microspheres e from Microbeads AS (Skedsmokorset, Norway) or monodisperse PMMA microspheres from EPRUI Nanoparticles & Microspheres Co. Ltd. (Nanjing China) having a coefficient of variation below about 3.5 percent.

It has been found that using particles at a number density between about $10^4$ mm$^{-3}$ and about $10^8$ mm$^{-3}$ can be effective in producing a desired degree of spreading a pixel image and/or in producing a desired reduction in iridescence. Typically a lower number density is useful when a large particle size is used and a larger number density is useful when a smaller particle size is used. In some embodiments, the number density is greater than $10^4$ mm$^3$ or $10^5$ mm$^3$ and less than $10^8$ mm$^3$ or $10^7$ mm$^3$.

Figure 8A:
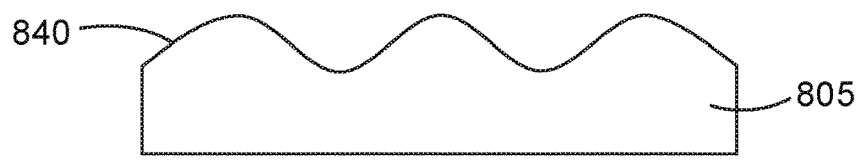
FIGS. 8A-8G illustrate a process of making a grating assembly
Figure 8B:
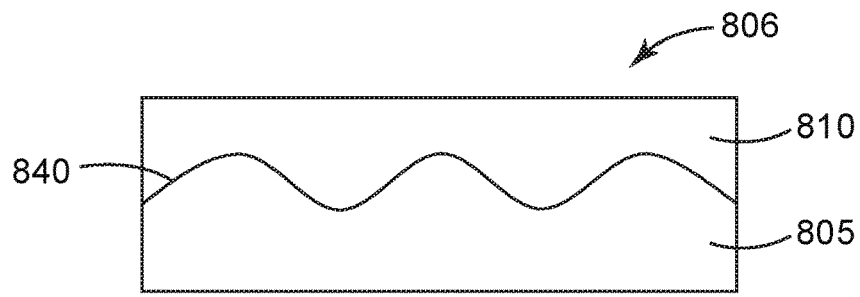
Figure 8C:
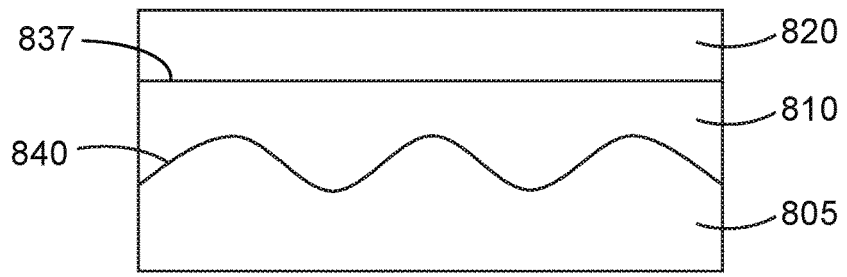
Figure 8D:
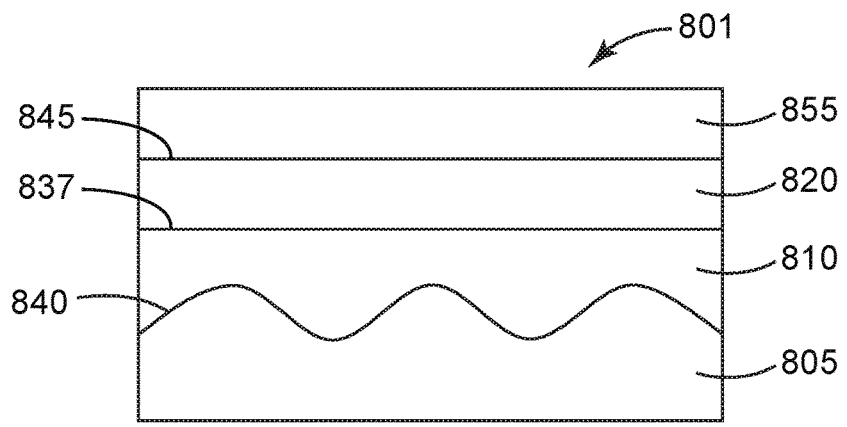

A method of making grating assemblies according the present description is illustrated in FIGS. 8A-8G. FIG. 8A shows a first release tool 805 having a structured first release surface 840. As used herein, a release tool may be a release film. For example, as described in greater detail elsewhere herein, a structure can be made on a film and the surface of the structure can be release treated to form a structured release film. First release tool 805 is coated with a first material on structured first release surface 840 forming first layer 810 on first release tool 805 thereby resulting in coated release tool 806 as illustrated in FIG. 8B. In some embodiments, first layer 810 is substantially continuous. In other embodiments, first layer 810 may be discontinuous. As described elsewhere, a discontinuous layer can be applied by ink jet printing or by using solvent coating techniques. In the next process step, a second material is applied onto the first material as illustrated in FIG. 8C. This forms a second layer 820 immediately adjacent the first layer 810 opposite the first release tool 805. An interface 837 is formed between first layer 810 and second layer 820. A second release tool 855 is applied to second layer 820 to form article 801 as illustrated in FIG. 8D. Second release tool 855 is immediately adjacent the second material opposite the first material with second release surface 845 facing the second material. An alternative to the steps illustrated in FIGS. 8C and 8D is to dispose the second material on the second release surface 845 of second release tool 855. The coated release tool is then applied to the first material giving article 801. In some embodiments, at least one of first layer 810 and second layer 820 is a viscoelastic or elastomeric adhesive so that article 801 is an optical adhesive which can be adhered to a surface after removing release tool 805 or 855.

In some embodiments, the first material is a first coatable resin, which may be a curable resin or a solvent-borne resin. In some embodiments, the first material is a curable resin in which case a curing step may be applied to cure the resin resulting in a crosslinked resin layer. The curing step may be applied before or after second layer 820 and second release tool 855 are applied. In some embodiments, the first material is a solvent-borne soluble resin in which case a solvent evaporation step may be applied to form a hardened soluble resin layer. The solvent evaporation step may be applied before second layer 820 is applied.

In some embodiments, the second material is a viscoelastic or elastomeric adhesive and the first material is a hardcoat resin. That is, a resin that when cured is hard enough to provide adequate pencil hardness or abrasion resistance in applications where the material can be an outer layer. For example, the cured hardcoat resin may provide a pencil hardness greater than HB or greater than H. In this case, article 801 can be used as an anti-moiré optical adhesive, for example, by removing second release tool 855 exposing the viscoelastic or elastomeric adhesive layer (second layer 820) which can then be attached to a display surface. First release tool 805 can be removed exposing a structured surface of the hardcoat layer (first layer 810). In some embodiments where article 801 is used in display applications, release tools 805 and 855 are sacrificial layers that are removed before article 801 is used in the display. Article 801 can also be further processed to add additional layers as illustrated in FIGS. 8E-8G.

Figure 8E:
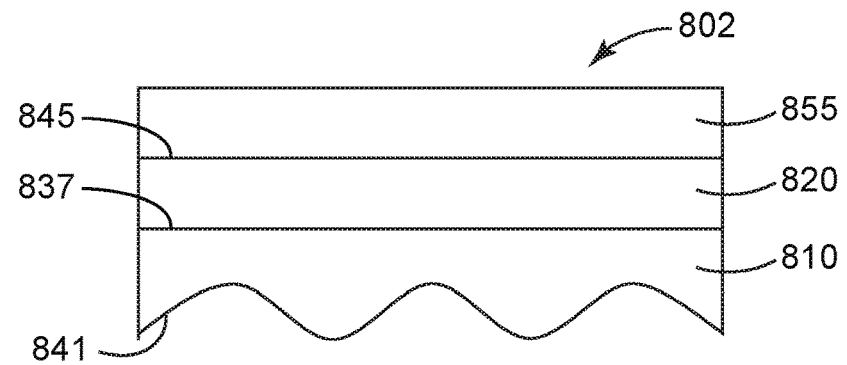
Figure 8F:
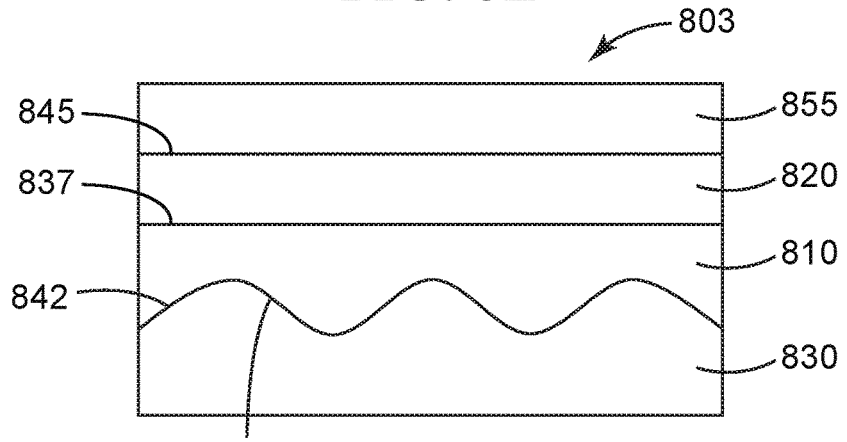
Figure 8G:
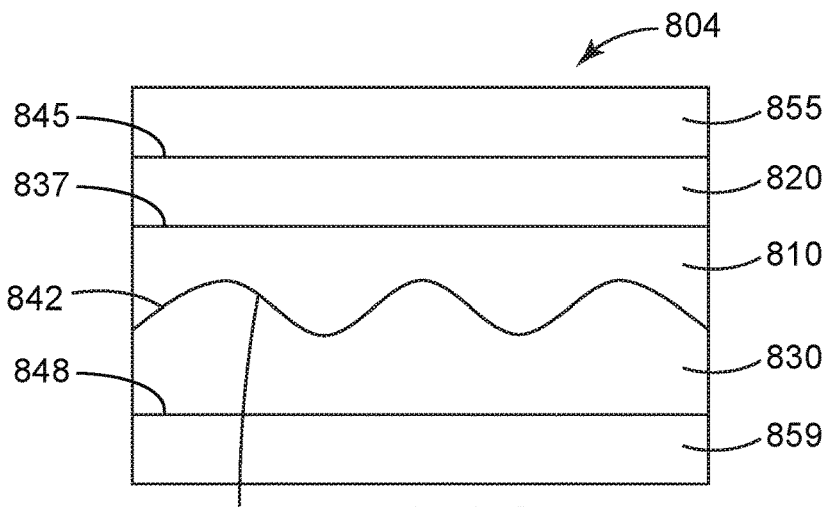

First release tool 805 is removed thereby exposing structured major surface 841 of first layer 810 resulting in article 802 shown in FIG. 8E. A third material is then applied onto structured major surface 841 forming article 803 having third layer 830 as shown in FIG. 8F. Interface 842 is formed between first layer 810 and third layer 830 and defines a grating 842a. In some embodiments, a third release tool 859 is then applied to third layer 830 with the third release surface 848 of the third release tool 859 facing third layer 830 forming article 804 as shown in FIG. 8G. An alternative to the steps shown in FIGS. 8F-8G is to coat the third material onto a third release surface of the third release tool 859 thereby forming a coated release tool and then applying the coated release tool onto structured major surface 841 with the third material facing structured major surface 841. In many embodiments, at least one of second layer 820 and third layer 830 is a viscoelastic or elastomeric adhesive layer so that article 804 is an optical adhesive which can be adhered to a surface after removing release tool 859 or 855. In some embodiments, the first material is a first viscoelastic optically clear adhesive and the third material is a second viscoelastic optically clear adhesive which may be the same or different from the first material. In some embodiments, the third material is a second coatable resin, which may be a curable resin or a solvent-borne resin.

Release tools 855 and 859 may be sacrificial layers, such as release films, that are removed before article 804 is used as an optical adhesive in display or other applications. In some embodiments, the second and third materials are the same or different viscoelastic or elastomeric adhesives.

In some embodiments, one or both of the release tools 855 and 859 are structured so that surfaces 845 and/or 848 are structured surfaces and so that the process results in an optical adhesive having two or three structured surfaces. In this case, the process can be repeated by removing a structured release liner thereby exposing a structured surface and then applying a fourth material the exposed structured surface. Such a process can be used to make a multilayered article such grating assembly 600 shown in FIG. 6, for example.

In some embodiments, any or all of the first, second and third release tools may be release films. In some embodiments, the steps illustrated in FIGS. 8A-8G are carried out in a continuous roll-to-roll process.

In some embodiments, each of the first layer 810, the second layer 820 and the third layer 830 are continuous layers. In some embodiments, the second layer 820 or the third layer 830 or both are discontinuous. In some embodiments, the first layer 810 is discontinuous. Any of the layers can be made discontinuous by applying the layer using ink jet printing techniques or by using standard solvent-borne coating techniques where a structure is coated and solvent is evaporated producing in a partial filling of the structure which results in a discontinuous layer. Any discontinuous layer may be include a plurality of discrete objects as described elsewhere. In some embodiments, the first material is a first viscoelastic or elastomeric adhesive and the second material is a second viscoelastic or elastomeric material which may the same or different from the first material.

Figure 9A:
FIGS. 9A-9F illustrate a process of making a grating assembly.
Figure 9B:
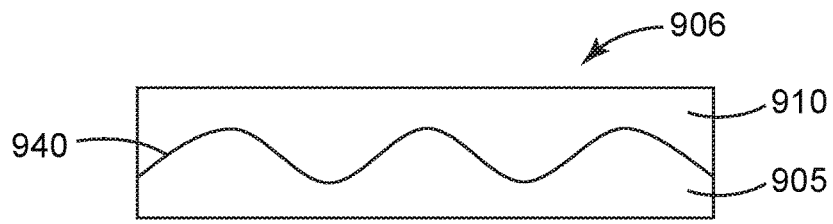
Figure 9C:
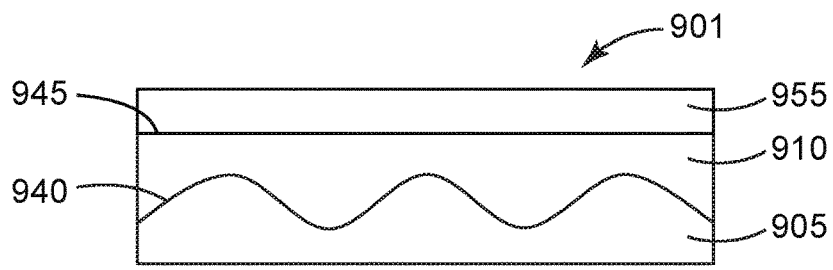

A method of making grating assemblies according the present description is illustrated in FIGS. 9A-9F. FIG. 9A shows a first release tool 905 having a structured first release surface 940. First release tool 905 is coated with a first material on structured first release surface 940 forming first layer 910 and resulting in coated release tool 906 as illustrated in FIG. 9B. In some embodiments, first layer 910 is substantially continuous. In other embodiments, first layer 910 may be a discontinuous layer as described elsewhere. In some embodiments, the first material is a coatable resin, which may be a curable resin or a solvent-borne resin. Next, a second release tool 955 is applied to first layer 910 to form article 901 as illustrated in FIG. 9C. Second release tool 955 is immediately adjacent the first material opposite the first release tool 905 with second release surface 945 facing the first material. Alternatively, the first material may be coated onto second release tool 955 and then the coated release tool applied to first release tool 905.

Figure 9D:
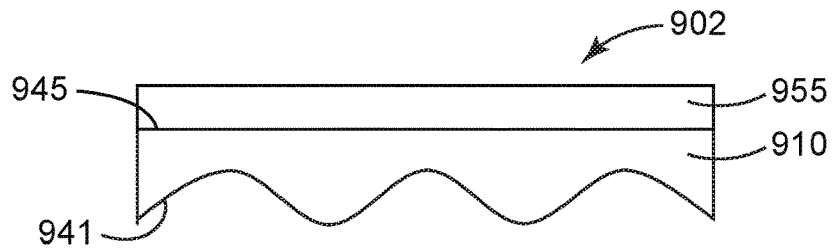
Figure 9E:
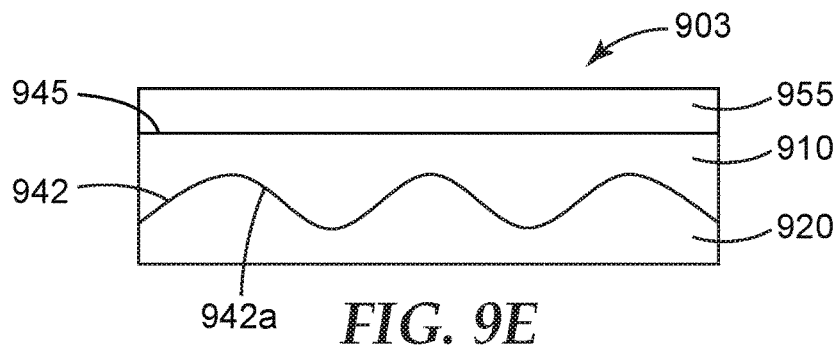
Figure 9F:
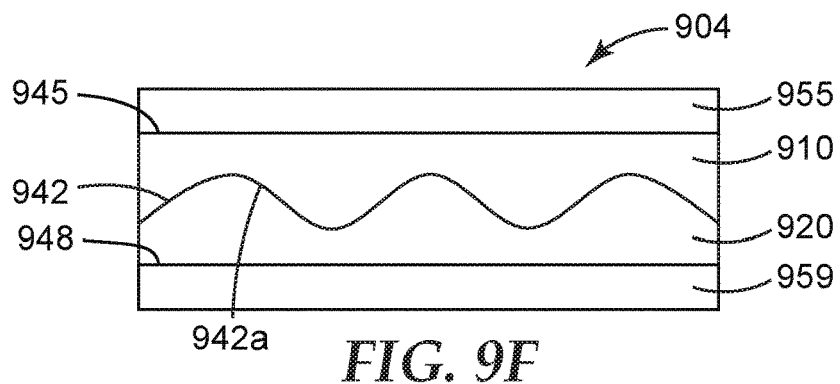

Next, first release tool 905 is removed thereby exposing structured major surface 941 of first layer 910 in the article 902 shown in FIG. 9D. A second material is then applied onto structured major surface 941 forming article 903 having second layer 920 as shown in FIG. 9E. Interface 942 is formed between first layer 910 and second layer 920 and defines grating 942*a*. In some embodiments, a third release tool 959 is then applied to second layer 920 with the third release surface 948 of the third release tool 959 facing second layer 920 forming article 904 as shown in FIG. 9F. An alternative to the steps shown in FIGS. 9E-9F is to coat the second material onto third release surface 948 of the third release tool 959 thereby forming a coated release tool and then applying the coated release tool onto structured major surface 941 with the second material facing structured major surface 941.

In many embodiments, the first material and/or the second material are adhesives and article 904 is an optical adhesive. In some embodiments, the first material is a first viscoelastic or elastomeric adhesive and the second material is a second viscoelastic or elastomeric material different from the first material. In some embodiments, the first material is a first viscoelastic optically clear adhesive and the second material is a second viscoelastic optically clear adhesive different from the first material.

Figure 10A:
FIGS. 10A-10F illustrate a process of making an optical stack.
Figure 10B:
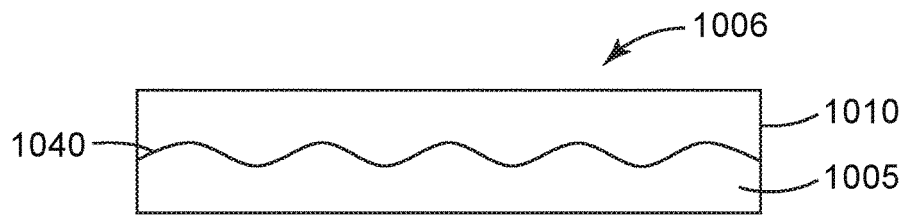
Figure 10C:
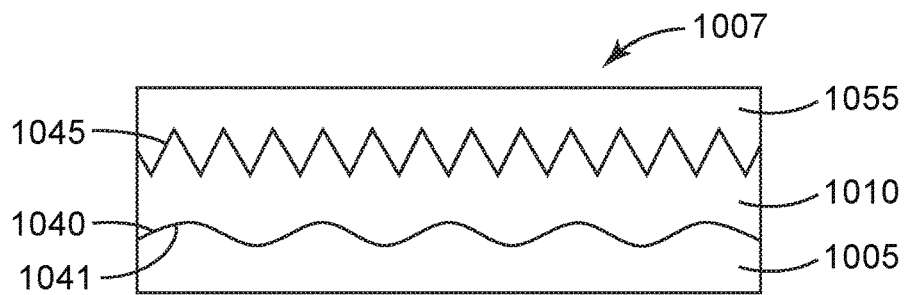
Figure 10D:
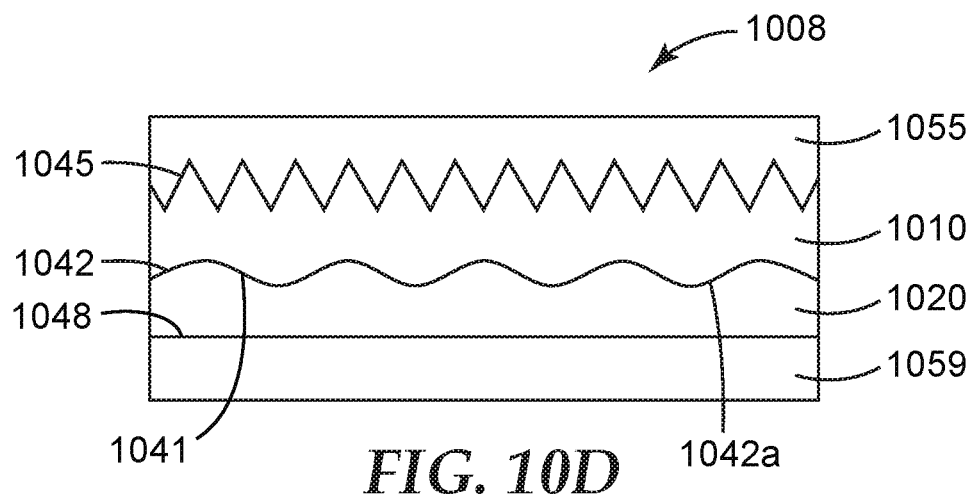

A method of making optical stacks according the present description is illustrated in FIGS. 10A-10F. FIG. 10A shows a first release tool 1005 having a structured first release surface 1040. First release tool 1005 is coated with a first material on structured first release surface 1040 forming first layer 1010 and resulting in coated release tool 1006 as illustrated in FIG. 10B. In some embodiments, first layer 1010 is substantially continuous. In other embodiments, first layer 1010 may be a discontinuous layer as described elsewhere. In some embodiments, the first material is a coatable resin, which may be a curable resin or a solvent-borne resin. In some embodiments, the first material is a hardcoat resin as described elsewhere. Next, a second release tool 1055 having a second release surface 1045 is applied to first layer 1010 forming article 1007 as illustrated in FIG. 10C. The first material flows or deforms to fill coat the second release surface 1045 which is a structured surface in the embodiment illustrated in FIGS. 10A-10F. Surface 1045 may be a periodically varying so that the upper portion of first layer 1010 is a periodically varying optical film layer. First release tool 1005 is then removed exposing a structured first surface 1041 in first layer 1010. A third release tool coated with a second material is applied on the structured first surface 1041 forming a second layer 1020 which forms interface 1042 with first layer 1010 and resulting in article 1008 as illustrated in FIG. 10D. Interface 1042 defines grating 1042*b*. In some embodiments, second layer 1020 is a viscoelastic or elastomeric adhesive layer and article 1008 is an optical adhesive. Alternatively, a second material may be coated onto structured first surface 1041 forming second layer 1020 and interface 1042 and then third release tool 1059 may be applied onto second layer 1020 with third release surface 1048 facing second layer 1020.

Figure 10E:
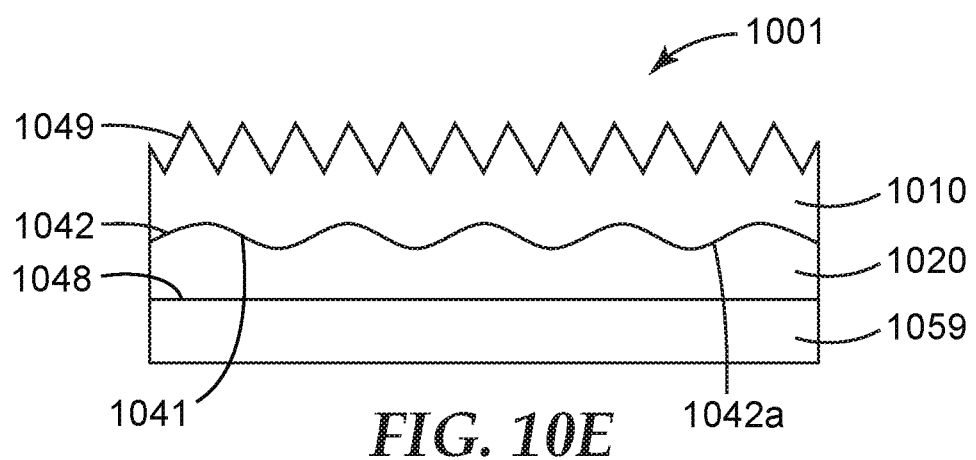
Figure 10F:
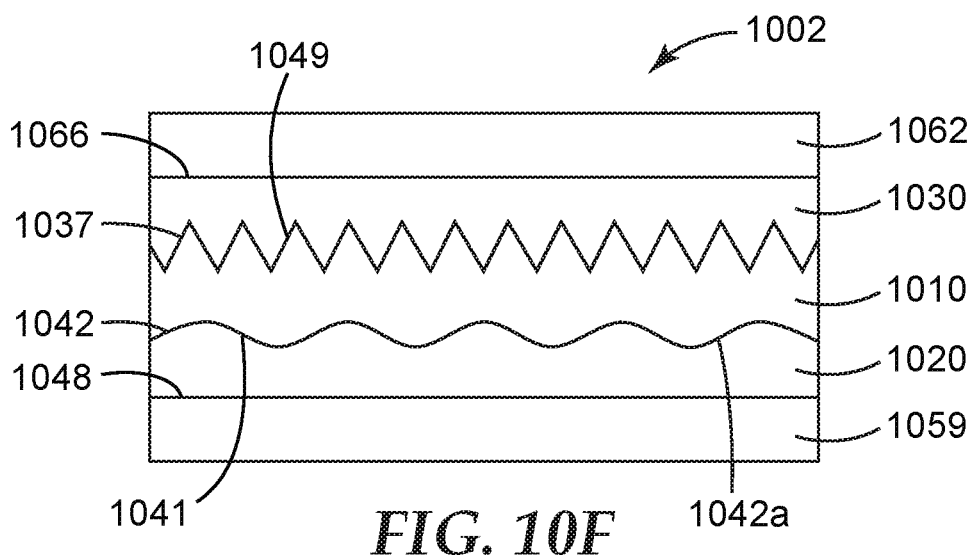

Next, second release tool 1055 is removed exposing structured second surface 1049 in first layer 1010 and producing article 1001 as illustrated in FIG. 10E. In some embodiments, second layer 1020 is a viscoelastic or elastomeric adhesive layer and article 1001 is an optical adhesive. A fourth release tool coated with a third material is applied the structured second surface 1049 forming a third layer 1030 which forms interface 1037 with first layer 1010 as illustrated in FIG. 10F, which provides a cross-sectional view of article 1002. Third layer 1030 may be a periodically varying optical film layer. Alternatively, a third material may be coated onto structured second surface 1049 forming third layer 1030 and interface 1037 and then fourth release tool 1062 may applied to third layer 1030 with third release surface 1066 facing third layer 1030. In some embodiments, at least one of second layer 1020 and third layer 1030 are viscoelastic or elastomeric adhesive layers so that article 1002 is an optical adhesive.

Figure 11:
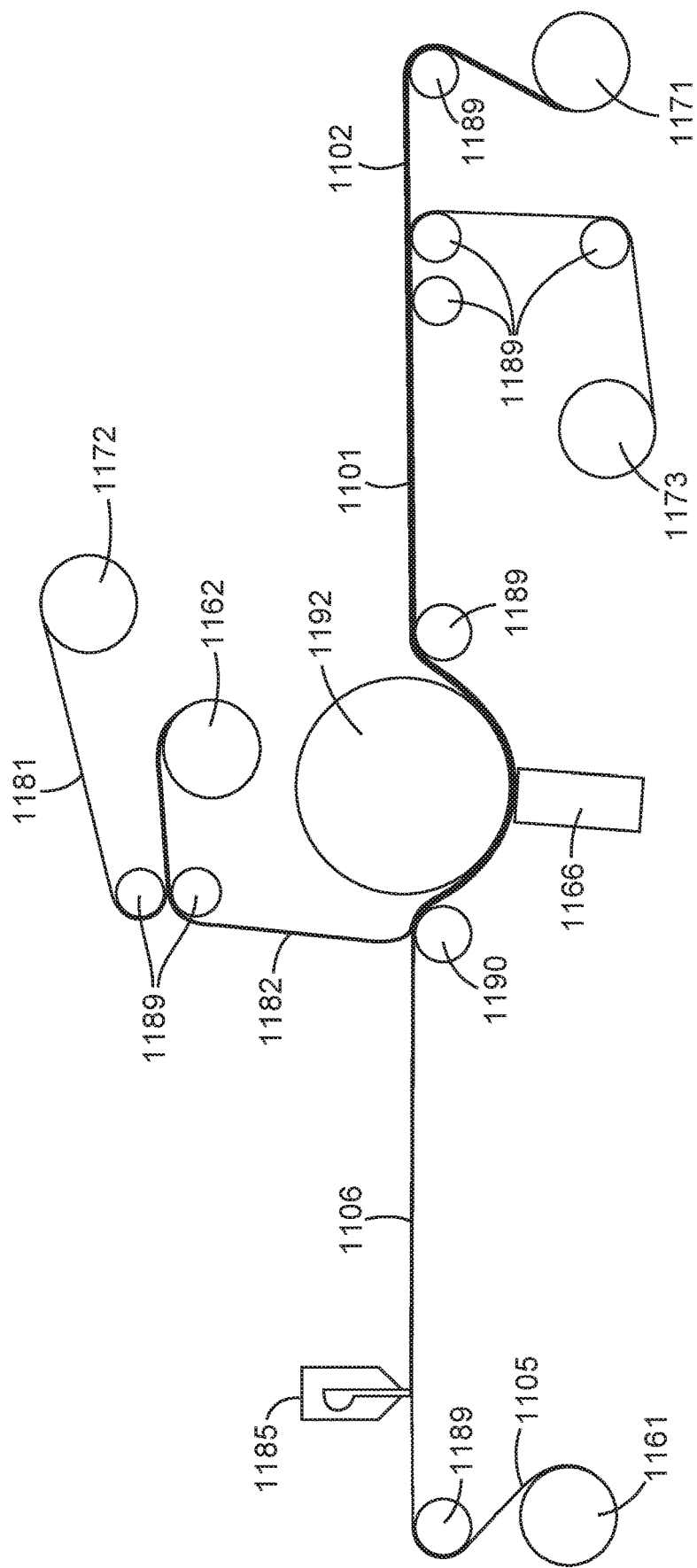
FIG. 11 illustrates a process of making a grating assembly.

Any of the methods illustrated in FIGS. 8A-10F can be carried out in continuous roll-to-roll processes. FIG. 11 illustrates a continuous process for making article 802 of FIG. 8E, for example. Additional continuous processing steps can be included to make article 804 of FIG. 8G, for example.

The structured release tool used in the process of FIG. 11 is a structured release film 1105 which is provided on an unwind roll 1161. Structured release film is continuously unwound from unwind roll 1161 and coated at various stages described elsewhere to produce article 1101. The structured release film 1105 is removed from article 1101 to produce article 1102 which is continuously wound onto wind roll 1171. The system illustrated in FIG. 11 includes various rollers 1189 to facilitate the movement of the various films through the system.

A structured release film can be prepared, for example, by using a continuous cast and cure process to form a structured surface on a film, such as a PET film. In a continuous cast and cure process a micro-replication roll can be made using a diamond tool to cut an inverted pattern into a copper roll which can be used to make the pattern on a substrate using a continuous cast and cure process utilizing a polymerizable resin. Suitable diamond tooling is known in the art and includes the diamond tooling described in U.S. Pat. No. 7,140,812 (Bryan et al.). Continuous cast and cure processes are known in the art and are described in the following patents: U.S. Pat. No. 4,374,077 (Kerfeld); U.S. Pat. No. 4,576,850 (Martens); U.S. Pat. No. 5,175,030 (Lu et al.); U.S. Pat. No. 5,271,968 (Coyle et al.); U.S. Pat. No. 5,558,740 (Bernard et al.); and U.S. Pat. No. 5,995,690 (Kotz et al.). The resulting structure can then be treated using conventional surface treatment techniques to produce structured release film 1105. For example, a surface treatment may include an oxygen plasma treatment followed by a tetramethylsilane (TMS) plasma treatment.

Structured release film 1105 is unwound from unwind roll 1161 and coated with a first material, which may be a radiation (e.g., ultraviolet (UV)) curable resin, to produce coated release film 1106. The first material may be die coated onto the structured side of structured release film 1105 using die coater 1185.

An adhesive (for example, a viscoelastic or elastomeric adhesive) between a first release liner and a second release liner is provided on unwind roll 1162. The first release liner 1181 is removed and wound onto wind roll 1172. The exposed surface of the adhesive in the resulting adhesive-coated release liner 1182 is then applied onto coated release film 1106 and passed between nip roller 1190 and backup roll 1192. In some embodiments, the first material is a UV-curable resin and a UV curing station 1166 is provided to cure the resin as it passes by backup roll 1192. The coated release film 1106 with the adhesive and second release liner in place is multilayered article 1101. Structured release film 1105 is removed from multilayered article 1101 producing multilayered article 1102 which is wound onto wind roll 1171. The removed structured release film 1105 is wound onto wind roll 1173. Article 1102 can have the general structure as article 802 of FIG. 8E. An alternative process adds the step of applying an additional adhesive coated release liner to the exposed structured surface of article 1102. This can result in an article having the general structure of article 804 of FIG. 8G.

In another embodiment, the first material is not applied with die coater 1185 and adhesive-coated release liner 1182 is applied directly to structured release film 1105. UV curing station 1166 may be omitted in this embodiment. Article 1101 may then have the general structure of article 901 of FIG. 9C and article 1102 may then have the general structure of article 902 of FIG. 9D. The exposed structured surface of article 1102 may then be coated with an adhesive and a release liner applied resulting in an article having the general structure of article 904 of FIG. 9F.

In some embodiments, article 1008 of FIG. 10D is made using a process similar to that illustrated in FIG. 11 except that unwind roll 1162 is replaced with an unwind roll containing a second structured release film. After structured release film 1105 (corresponding to first release tool 1005) is removed, a coating may be applied to the exposed structured surface using a die coater, for example, and a second release film applied to the coating resulting in article 1008. Similarly, the second structured release film can be removed and an additional coating and release film can be applied to produce article 1102 of FIG. 10F.

Figure 12:
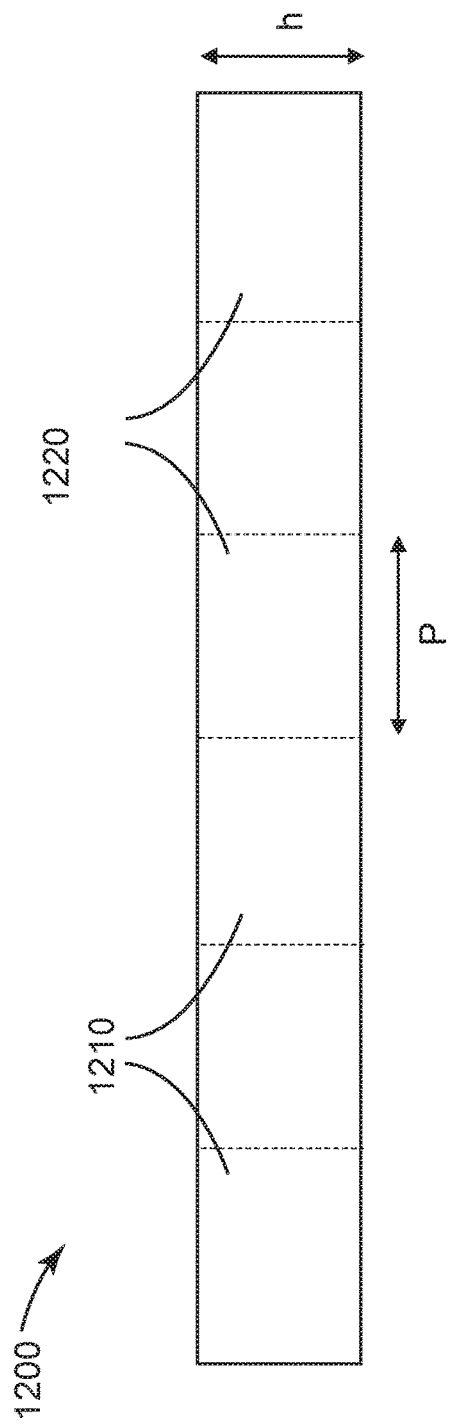
FIG. 12 is a cross-sectional view of a grating assembly.

In some embodiments, other types of gratings may be used. For example, in some embodiments a volume grating may be used as the grating assembly in any of the optical stacks, polarizer stacks and optical systems of the present description. FIG. 12 is a cross-sectional view of grating 1200 which in the illustrated embodiment is a single layer of substantially uniform thickness h and may be described as a single-layer grating assembly. Grating 1200 includes alternating first and second regions 1210 and 1220. The first region 1210 has a refractive index $n_1$ and the second region 1220 has a different refractive index $n_2$. Accordingly, grating 1200 may be described as having a periodically modulated refractive index. In some embodiments, $|n_1-n_2|$ multiplied by h is between about 150 nm and about 10 micrometers (or 2 micrometers, or 1 micrometer, or 500 nm, or 350 nm) and the grating 1200 has a first pitch, P, in a first direction in the range of about 2 micrometers to about 50 micrometers. In some embodiments, grating 1200 is a two-directional grating and in some embodiments grating 1200 in a one-directional grating. In some embodiments, an optical stack includes two layers of grating 1200 with each layer being one-directional and with the gratings oriented differently (e.g., orthogonally oriented). In some embodiments, grating 1200 is a single layer and may be a single polymer layer. In some embodiments, each of the first and second regions 1210 and 1220 extend through the thickness of the grating 1200. In some embodiments, an additional substrate is attached to one or both major surfaces of grating 1200.

Grating 1200 can be made by coating a mixture of a polymer and a monomer (e.g., a radiation curable acrylate monomer) onto a substrate to form a layer. The mixture can include a photo-initiator so that the monomer can be cured by the application of a light source. The layer may then be exposed to a periodic photo-initiating light source, which may, for example, be created by two interfering laser beams. This causes monomer to be cured in regions of high light intensity which results in a concentration gradient of monomer in the layer. Monomer will therefore diffuse from regions with high monomer concentration to regions with low monomer concentration. The layer is then exposed to additional photo-initiating light to fully cure the layer. The layer will typically exhibit a higher refractive index in regions where the periodic photo-initiating light source was applied since monomer diffused into these regions resulting in higher density in these regions.

Other suitable gratings that may be used in some embodiments include the Volume Phase Holographic (VPH) transmission gratings available from Kaiser Optical Systems, Inc. (Ann Arbor, Mich.), and the Volume Holographic Gratings (VHG) available from Ondax, Inc. (Monrovia, Calif.).

EXAMPLES

Materials

| Abbreviation | Description |
|---|---|
| PET Film | 5 mil (127 micron), 1 side primed PET film available from 3M Company, St. Paul, MN |
| RF Release Liner | Release liner, commercially available from SKC Haus, Kangnam-gu, Seoul stated as "RF02N" |
| Photomer 6210 | Aliphatic urethane diacrylate available from Sartomer Americas, Exton, PA |
| HDDA | 1,6-hexanediol diacrylate available from Sigma-Aldrich Chemical Company, Milwaukee, WI |
| TMPTA | Trimethylolpropane triacrylate available from Sigma-Aldrich Chemical Company, Milwaukee, WI |
| TPO | 2,4,6-trimethylbenzoyl-diphenyl-phosphineoxide available from Sigma-Aldrich Chemical Company, Milwaukee, WI |
| CN-120 | Epoxy acrylate available from Sartomer Americas, Exton, PA |

| Abbreviation | Description |
|---|---|
| PEA | Phenoxyethyl acrylate available from Sigma-Aldrich Chemical Company, Milwaukee, WI |
| DAROCUR 1173 | Photoinitiator available from BASF, Ludwigshafen, Germany |
| R1 | Polymerizable resin composition having a refractive index of 1.47, prepared by mixing Photomer 6210, HDDA, TMPTA, TPO at a weight ratio of 60/20/20/0.5 |
| R2 | Polymerizable resin composition having a refractive index 1.57 prepared by mixing CN-120, PEA, DAROCUR 1173, TPO at a weight ratio of 75/25/0.25/0.1 |
| TPF290 Privacy Filter | A louver film available from 3M Company, St. Paul, MN |
| TBEF-GT | A prism film available from 3M Company, St. Paul, MN |
| APF V2 | A reflective polarizer film available from 3M Company, St. Paul, MN |
| 818x | An optically clear adhesive available from 3M Company, St. Paul, MN |
| CEF 28 | An optically clear adhesive available from 3M Company, St. Paul, MN |

Example 1

A grating was prepared according to the following procedure. A tool was fabricated using a diamond turning method that utilized a fast tool servo (FTS) as described, for example, in PCT Published Application No. WO 00/48037 (Campbell et al.), and U.S. Pat. No. 7,350,442 (Ehnes et al.) and U.S. Pat. No. 7,328,638 (Gardiner et al.). The tool was used in a cast-and-cure process as described, for example, in U.S. Pat. No. 5,175,030 (Lu et al.) and U.S. Pat. No. 5,183,597 (Lu), to produce two-directional sinusoidal structures on the primed side of a 5 mil (0.13 mm) thick PET film. An acrylate resin having a refractive index of 1.56 was used to form the sinusoidal structures. The sinusoidal structures had a peak-to-valley height of 2.4 micrometers and a pitch (peak-to-peak or valley-to-valley distance) of 16 microns in each of two orthogonal directions.

The two direction sinusoidal grating was overcoated with optically clear adhesive 818x. The refractive index difference between the resin and the adhesive was 0.1. This refractive index contrast was chosen such that the light transmitted through the grating would be spread over a 1.5 degree half angle with greater than 90% of the light within that half angle when measured with a 532 nm light source. The grating assembly was lamented onto a 3M TPF290 Privacy Filter and a 20 degree bias (i.e., a repeat direction of the grating was oriented at a 20 degree angle with respect to the repeat direction of the privacy filter) to form an optical stack. The optical stack was then placed on a portion of a computer screen (an HP EliteBook Folio9470m with a screen resolution of 1366×768) and a 3M TPF290 Privacy Filter was place on another portion of the computer screen at the same orientation. Moiré was observed from the 3M TPF290 privacy filter without the grating, but the moire was not visible to the eye through the optical stack including the grating.

Example 2

The grating assembly of Example 1 was lamented at a 20 degree bias on a portion of a Kindle fire HDX. A pressure sensitive adhesive with repositionable properties, as described in WO 2015/116652 (Baetzold et al.) in the "Conformable Liner Example", was laminated over the top of the grating assembly and over a portion of the display not covered by the grating assembly. Moiré was visible in the portion of the display not including the grating and was not visible in the portion of the display including the grating.

Example 3

The repositionable pressure sensitive adhesive described in Example 2 was laminated to a Kindle fire HDX and a moiré pattern was observed. The 2D grating assembly of Example 1 was placed on top of the pressure sensitive adhesive and the moiré was observed to be substantially reduced.

Examples 4 and 5

A two directional grating having the grating geometry described in Example 1, was replicated onto a piece of TBEF-GT (a prism film available from 3M Company, St. Paul, Minn.) on the back side of the prism film. It was replicated at a bias of about 20 degrees to the prism film using resin R2. In Example 4, the grating structure was left open to the air, and in Example 5, the grating structure was overcoated with resin R1. One film at a time was placed on top and orthogonal to another piece of TBEF-GT and tested for moiré. The film of Example 4 (not overcoated) showed no moiré. The film of Example 5 (overcoated) showed a small amount of moiré but substantially less than the prism film with no microreplicated grating structure.

Example 6

A two direction grating having the grating geometry described in Example 1, was replicated onto a piece of APF V2 using resin R2, with cure conditions of 30 feet per minute (9.1 meters per minute) under a high intensity H bulb (Fusion UV-Light hammer 6 with H bulbs, RPC industries Model Number I6P1/LH), to form a polarizer assembly. CEF 28 was laminated to the structured side of the resin. This construction was then lamented to a 1 mm thick glass slide for ease of handling. A 7 inch Kindle fire was used as a test bed. The liquid crystal display (LCD) of the Kindle fire was disassembled so the diffuser and prism films behind the LCD panel could be accessed. In order to maximize the pixel moiré interaction with the prism film the top side diffuser was removed and the prism films were placed at approximately 45 degrees to the LCD. The polarizer assembly with the grating was used as the bottom side polarizer. The entire construction was placed on a light box to simulate a backlight display. The moiré lines were observed to be significantly reduced compared to an otherwise equivalent reference configuration not including the grating.

The following is a list of exemplary embodiments.

Embodiment 1 is an optical stack, comprising:
a grating assembly comprising a first layer and a second layer; and
a periodically varying optical film layer disposed adjacent the grating assembly,
wherein a first interface between the first layer and the second layer defines a first grating, the first layer has a refractive index $n_1$, the second layer has a refractive index $n_2$, the first grating has a peak to valley height of $h_1$, wherein $|n_1-n_2|$ multiplied by $h_1$ is between about 150 nm and about 350 nm and the first grating has a first pitch in a range of about 2 micrometers to about 50 micrometers, and
wherein each of the first and second layers are selected from the group consisting of viscoelastic or elastomeric adhesive layers, crosslinked resin layers, and soluble resin layers.

Embodiment 2 is the optical stack of embodiment 1, wherein the first layer is a first viscoelastic or elastomeric adhesive layer.

Embodiment 3 is the optical stack of embodiment 2, wherein the second layer is a second viscoelastic or elastomeric adhesive layer.

Embodiment 4 is the optical stack of embodiment 2, wherein the second layer is a crosslinked or soluble resin layer.

Embodiment 5 is the optical stack of embodiment 1, wherein the first layer is a first crosslinked or soluble resin layer and the second layer is a second crosslinked or soluble resin layer.

Embodiment 6 is the optical stack of embodiment 1, wherein the first layer is a first crosslinked resin layer and the second layer is a second crosslinked resin layer.

Embodiment 7 is the optical stack of embodiment 1, wherein the first layer and a portion of the periodically varying optical film layer are monolithic.

Embodiment 8 is the optical stack of embodiment 1, wherein the first pitch is in a first direction and the periodically varying optical film layer has a second pitch in a different second direction.

Embodiment 9 is the optical stack of embodiment 1, wherein the grating assembly further comprises a third layer disposed adjacent the second layer opposite the first layer.

Embodiment 10 is the optical stack of embodiment 9, wherein the grating assembly and the periodically varying optical film layer are disposed such that the first layer is between the second layer and the periodically varying optical film layer.

Embodiment 11 is the optical stack of embodiment 9, wherein the grating assembly and the periodically varying optical film layer are disposed such that the third layer is between the second layer and the periodically varying optical film layer.

Embodiment 12 is the optical stack of embodiment 9, wherein the first layer is a first viscoelastic or elastomeric adhesive layer, the second layer is a crosslinked or soluble resin layer disposed immediately adjacent the first layer, and the third layer is a second viscoelastic or elastomeric adhesive layer disposed immediately adjacent the second layer.

Embodiment 13 is the optical stack of embodiment 9, wherein a second interface between the second layer and the third layer defines a second grating, the third layer has a refractive index $n_3$, the second grating has a peak to valley height of $h_2$, wherein $|n_2-n_3|$ multiplied by $h_2$ is between about 150 nm and about 350 nm and the second grating has a second pitch in the range of about 2 micrometers to about 50 micrometers.

Embodiment 14 is the optical stack of embodiment 13, wherein the first grating extends in a first direction and the second grating extends in a different second direction.

Embodiment 15 is the optical stack of embodiment 14, wherein the first and second directions are substantially orthogonal.

Embodiment 16 is the optical stack of embodiment 14, wherein each of the first and second gratings are at an oblique angle to the periodically varying optical film layer.

Embodiment 17 is the optical stack of embodiment 9, wherein a second interface between the second layer and the third layer is substantially unstructured.

Embodiment 18 is the optical stack of embodiment 1, wherein the first grating is a two-directional grating.

Embodiment 19 is the optical stack of embodiment 18, wherein the first pitch is along a first direction and the first grating has a second pitch along a different second direction.

Embodiment 20 is the optical stack of embodiment 19, wherein the first and second directions are substantially orthogonal.

Embodiment 21 is the optical stack of embodiment 19, wherein the first and second pitches are substantially the same.

Embodiment 22 is the optical stack of embodiment 19, wherein the first and second pitches are different.

Embodiment 23 is the optical stack of embodiment 1, further comprising one or more additional layers disposed between the periodically varying optical film layer and the grating assembly.

Embodiment 24 is the optical stack of embodiment 1, wherein the first grating is oriented at an oblique angle to the periodically varying optical film layer.

Embodiment 25 is the optical stack of embodiment 1, wherein the periodically varying optical film layer is a louver film.

Embodiment 26 is the optical stack of embodiment 25 being an integral optical stack.

Embodiment 27 is the optical stack of embodiment 26, wherein the first layer is a viscoelastic or elastomeric adhesive layer adapted to affix the louver film to a display.

Embodiment 28 is the optical stack of embodiment 1, wherein a louver film comprises the periodically varying optical film layer.

Embodiment 29 is the optical stack of embodiment 28, wherein the louver film further comprises the first layer of the grating assembly.

Embodiment 30 is the optical stack of embodiment 1, wherein the periodically varying optical film layer is a periodically structured adhesive layer.

Embodiment 31 is the optical stack of embodiment 1, wherein the periodically varying optical film is an asymmetric turning film having a major surface, wherein the major surface comprises a plurality of microstructures, each microstructure comprising a first face having a first shape and a second face having a different second shape.

Embodiment 32 is the optical stack of embodiment 31, wherein the first shape is substantially flat and the second shape is substantially curved.

Embodiment 33 is an optical system comprising:
a first light source and a second light source having differently oriented light distributions; and the optical stack of embodiment 31,
wherein light from the first light source is preferentially reflected by the first face but not the second face; and wherein light from the second light source is preferentially reflected by the second face but not the first face.

Embodiment 34 is the optical system of embodiment 33 further comprising a display surface, the optical system having two display modes, wherein in the first mode, the display surface emits light having a first characteristic set of viewing angles, and wherein in the second mode the display surface emits light having a second characteristic set of viewing angles, wherein the first characteristic set of viewing angles and the second characteristic set of viewing angles have different widths.

Embodiment 35 is the optical stack of embodiment 1, wherein the periodically varying optical film layer is a prism film.

Embodiment 36 is the optical stack of embodiment 35, further comprising a polarizer disposed between the grating assembly and the prism film.

Embodiment 37 is the optical stack of embodiment 36, wherein the polarizer is a reflective polarizer.

Embodiment 38 is the optical stack of embodiment 1, wherein the periodically varying optical film layer comprises a structured surface and an opposing substantially planar surface.

Embodiment 39 is the optical stack of embodiment 38, wherein the substantially planar surface of the periodically varying optical film layer is disposed immediately adjacent a substantially planar surface of the first layer.

Embodiment 40 is the optical stack of embodiment 1 being an integral optical stack.

Embodiment 41 is the optical stack of embodiment 1, wherein the periodically varying optical film has a second pitch and a ratio of the second pitch to the first pitch is in a range of about 1 to about 200.

Embodiment 42 is a display comprising a display panel and the optical stack of embodiment 1 disposed adjacent the display panel.

Embodiment 43 is the display of embodiment 42, wherein the display produces a reduced moiré pattern compared to an otherwise equivalent reference display not including the grating assembly.

Embodiment 44 is the display of embodiment 42, the display panel having a plurality of discrete spaced apart pixels having a second pitch and a ratio of the second pitch to the first pitch is in a range of about 0.1 to about 200.

Embodiment 45 is a polarizer stack, comprising:
a grating assembly comprising a first layer and a second layer; and
a polarizer disposed adjacent the grating assembly,
wherein a first interface between the first layer and the second layer defines a first grating, the first layer has a refractive index $n_1$, the second layer has a refractive index $n_2$, the first grating has a peak to valley height of $h_1$, wherein $|n_1-n_2|$ multiplied by $h_1$ is between about 150 nm and about 350 nm and the first grating has a first pitch in a range of about 2 micrometers to about 50 micrometers, and
wherein each of the first and second layers are selected from the group consisting of viscoelastic or elastomeric adhesive layers, crosslinked resin layers, and soluble resin layers, and
wherein the polarizer stack is an integral stack.

Embodiment 46 is the polarizer stack of embodiment 45, wherein the polarizer is a reflective polarizer.

Embodiment 47 is an optical stack comprising the polarizer stack of embodiment 45 and a periodically varying optical film layer disposed adjacent the polarizer stack.

Embodiment 48 is the optical stack of embodiment 47 being an optical stack according to any of embodiments 2 to 35 or 37 to 41.

Embodiment 49 is the optical stack of embodiment 47, wherein the periodically varying optical film layer is a prism film.

Embodiment 50 is the polarizer stack of embodiment 45, wherein the grating assembly is further characterized by any of embodiments 2 to 9 or 12 to 22.

Embodiment 51 is a display comprising the polarizer stack of embodiment 45 disposed between a display panel and a backlight.

Embodiment 52 is the display of embodiment 51, further comprising at least one prism film disposed between the backlight and the polarizer stack.

Embodiment 53 is an optical stack, comprising:
a first grating; and
a periodically varying optical film layer disposed adjacent the first grating,
wherein the first grating has a periodically modulated refractive index, the first grating comprising alternating first and second regions, the first region having a refractive index $n_1$, the second region having a refractive index $n_2$, the first grating having a thickness of h, wherein $|n_1-n_2|$ multiplied by h is between about 150 nm and about 10 micrometers, and the first grating has a first pitch in a first direction in a range of about 2 micrometers to about 50 micrometers, and
wherein the optical stack is configured to be placed over a display or placed between a backlight and a display panel.

Embodiment 54 is the optical stack of embodiment 53, wherein a single layer of substantially uniform thickness comprises the first grating.

Embodiment 55 is the optical stack of embodiment 54, wherein the single layer is a polymeric layer and the first and second regions each extend through the thickness of the layer.

Embodiment 56 is the optical stack of embodiment 53, wherein the first region is formed from a material selected from the group consisting of viscoelastic or elastomeric adhesive layers, crosslinked resin layers, and soluble resin layers.

Embodiment 57 is the optical stack of embodiment 53, wherein the second region is air.

Embodiment 58 is the optical stack of embodiment 53, wherein $|n_1-n_2|$ multiplied by h is between about 150 nm and 2 micrometers.

Embodiment 59 is the optical stack of embodiment 53, wherein $|n_1-n_2|$ multiplied by h is between about 150 nm and 1 micrometers.

Embodiment 60 is the optical stack of embodiment 53, wherein $|n_1-n_2|$ multiplied by h is between about 150 nm and 500 nm.

Embodiment 61 is the optical stack of embodiment 53, wherein $|n_1-n_2|$ multiplied by h is between about 150 nm and 350 nm.

Embodiment 62 is the optical stack of embodiment 53, wherein the first grating is a two-directional grating.

Embodiment 63 is the optical stack of embodiment 62, wherein the first pitch is along a first direction and the first grating has a second pitch along a different second direction.

Embodiment 64 is the optical stack of embodiment 63, wherein the first and second directions are substantially orthogonal.

Embodiment 65 is the optical stack of embodiment 63, wherein the first and second pitches are substantially the same.

Embodiment 66 is the optical stack of embodiment 63, wherein the first and second pitches are different.

Embodiment 67 is the optical stack of embodiment 53 further comprising a second grating.

Embodiment 68 is the optical stack of embodiment 53, wherein the first grating comprises a portion of a first layer, a portion of a second layer, and an interface between the first and second layers.

Embodiment 69 is the optical stack of embodiment 53, wherein each of the first and second layers are selected from the group consisting of viscoelastic or elastomeric adhesive layers, crosslinked resin layers, and soluble resin layers.

Embodiment 70 is the optical stack of embodiment 69, wherein a grating assembly comprises the grating, the grating assembly being further characterized by any of embodiments 2 to 9 or 12 to 22.

Embodiment 71 is the optical stack of embodiment 53, wherein a louver film comprises the periodically varying optical film layer.

Embodiment 72 is the optical stack of embodiment 53, wherein the periodically varying optical film is an asymmetric turning film having a major surface, wherein the major surface comprises a plurality of microstructures, each microstructure comprising a first face having a first shape and a second face having a different second shape.

Embodiment 73 is an optical stack, comprising:
a louver film; and
a first grating adjacent the louver film,
wherein the first grating has a periodically modulated refractive index, the first grating comprising alternating first and second regions, the first region having a refractive index $n_1$, the second region having a refractive index $n_2$, the first grating has a thickness of h, wherein $|n_1-n_2|$ multiplied by h is between about 150 nm and about 10 micrometers and the first grating has a first pitch in a first direction in a range of about 2 micrometers to about 50 micrometers, and
wherein the optical stack is an integral stack.

Embodiment 74 is the optical stack of embodiment 73, wherein a single layer of substantially uniform thickness comprises the grating.

Embodiment 75 is the optical stack of embodiment 74, wherein the single layer is a polymeric layer and the first and second regions each extend through the thickness of the layer.

Embodiment 76 is the optical stack of embodiment 73, wherein the first grating is a two-directional grating.

Embodiment 77 is the optical stack of embodiment 76, wherein the first pitch is along a first direction and the first grating has a second pitch along a different second direction.

Embodiment 78 is the optical stack of embodiment 77, wherein the first and second directions are substantially orthogonal.

Embodiment 79 is the optical stack of embodiment 77, wherein the first and second pitches are substantially the same.

Embodiment 80 is the optical stack of embodiment 77, wherein the first and second pitches are different.

Embodiment 81 is the optical stack of embodiment 73 further comprising a second grating.

Embodiment 82 is the optical stack of embodiment 73, wherein the first grating comprises a portion of a first layer, a portion of a second layer, and an interface between the first and second layers.

Embodiment 83 is the optical stack of embodiment 82, wherein each of the first and second layers are selected from the group consisting of viscoelastic or elastomeric adhesive layers, crosslinked resin layers, and soluble resin layers.

Embodiment 84 is the optical stack of embodiment 83, wherein a grating assembly comprises the grating, the grating assembly being further characterized by any of embodiments 2 to 9 or 12 to 22.

Embodiment 85 is the optical stack of embodiment 73, wherein $|n_1-n_2|$ multiplied by h is between about 150 nm and 2 micrometers.

Embodiment 86 is the optical stack of embodiment 73, wherein $|n_1-n_2|$ multiplied by h is between about 150 nm and 1 micrometers.

Embodiment 87 is the optical stack of embodiment 73, wherein $|n_1-n_2|$ multiplied by h is between about 150 nm and 500 nm.

Embodiment 88 is the optical stack of embodiment 73, wherein $|n_1-n_2|$ multiplied by h is between about 150 nm and 350 nm.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An optical stack, comprising:
a grating assembly comprising a first layer and a second layer; and
a periodically varying optical film layer disposed adjacent the grating assembly, wherein a louver film or an asymmetric turning film comprises the periodically varying optical film layer,
wherein a first interface between the first layer and the second layer defines a first grating, the first layer has a refractive index $n_1$, the second layer has a refractive index $n_2$, the first grating has a peak to valley height of $h_1$, wherein $|n_1-n_2|$ multiplied by $h_1$ is between 150 nm and 350 nm and the first grating has a first pitch in a range of 2 micrometers to 50 micrometers, and
wherein each of the first and second layers are selected from the group consisting of viscoelastic or elastomeric adhesive layers, crosslinked resin layers, and soluble resin layers.

2. The optical stack of claim 1, wherein the first layer is a first viscoelastic or elastomeric adhesive layer.

3. The optical stack of claim 2, wherein the second layer is a second viscoelastic or elastomeric adhesive layer.

4. The optical stack of claim 2, wherein the second layer is a crosslinked or soluble resin layer.

5. The optical stack of claim 1, wherein the first pitch is in a first direction and the periodically varying optical film layer has a second pitch in a different second direction.

6. The optical stack of claim 1, wherein the grating assembly further comprises a third layer disposed adjacent the second layer opposite the first layer, the first layer is a first viscoelastic or elastomeric adhesive layer, the second layer is a crosslinked or soluble resin layer disposed immediately adjacent the first layer, and the third layer is a second viscoelastic or elastomeric adhesive layer disposed immediately adjacent the second layer.

7. The optical stack of claim 1, wherein the first grating is a two-directional grating.

8. The optical stack of claim 1, wherein the louver film comprises the periodically varying optical film layer.

9. The optical stack of claim 1, wherein the asymmetric turning film comprises the periodically varying optical film layer, the asymmetric turning film having a major surface, wherein the major surface comprises a plurality of microstructures, each microstructure comprising a first face having a first shape and a second face having a different second shape.

10. An optical system comprising:
a first light source and a second light source having differently oriented light distributions; and
the optical stack of claim 9,
wherein light from the first light source is preferentially reflected by the first face but not the second face; and
wherein light from the second light source is preferentially reflected by the second face but not the first face.

11. The optical system of claim 10, further comprising a display surface, the optical system having first and second display modes, wherein in the first display mode, the display surface emits light having a first characteristic set of viewing angles, and wherein in the second display mode the display surface emits light having a second characteristic set of viewing angles, wherein the first characteristic set of viewing angles and the second characteristic set of viewing angles have different widths.

12. A polarizer stack, comprising:
a grating assembly comprising a first layer and a second layer; and
a polarizer disposed adjacent the grating assembly,
wherein a first interface between the first layer and the second layer defines a first grating, the first layer has a refractive index $n_1$, the second layer has a refractive index $n_2$, the first grating has a peak to valley height of $h_1$, wherein $|n_1-n_2|$ multiplied by $h_1$ is between 150 nm and 350 nm and the first grating has a first pitch in a range of 2 micrometers to 50 micrometers, and
wherein each of the first and second layers are selected from the group consisting of viscoelastic or elastomeric adhesive layers, crosslinked resin layers, and soluble resin layers, and wherein the polarizer stack is an integral stack.

13. An optical stack, comprising:
a first grating; and
a periodically varying optical film layer disposed adjacent the first grating,
wherein the first grating has a periodically modulated refractive index, the first grating comprising alternating first and second regions, the first region having a refractive index $n_1$, the second region having a refractive index $n_2$, the first grating having a thickness of h, wherein $|n_1-n_2|$ multiplied by h is between 150 nm and 10 micrometers, and the first grating has a first pitch in a first direction in a range of 2 micrometers to 50 micrometers, and
wherein the optical stack is configured to be placed over a display or placed between a backlight and a display panel.

14. The optical stack of claim 13, wherein a single layer of substantially uniform thickness comprises the first grating.

15. The optical stack of claim 14, wherein the single layer is a polymeric layer and the first and second regions each extend through the thickness of the layer.

16. The optical stack of claim 13, wherein the first region is formed from a material selected from the group consisting of viscoelastic or elastomeric adhesive layers, crosslinked resin layers, and soluble resin layers.

17. The optical stack of claim 13, wherein $|n_1-n_2|$ multiplied by h is between 150 nm and 1 micrometers.

18. The optical stack of claim 13, wherein each of the first and second regions are selected from the group consisting of viscoelastic or elastomeric adhesive layers, crosslinked resin layers, and soluble resin layers.

19. An optical stack, comprising:
a louver film; and
a first grating adjacent the louver film,
wherein the first grating has a periodically modulated refractive index, the first grating comprising alternating first and second regions, the first region having a refractive index $n_1$, the second region having a refractive index $n_2$, the first grating has a thickness of h, wherein $|n_1-n_2|$ multiplied by h is between 150 nm and 10 micrometers and the first grating has a first pitch in a first direction in a range of 2 micrometers to 50 micrometers, and
wherein the optical stack is an integral stack.

20. The optical stack of claim 19, wherein $|n_1-n_2|$ multiplied by h is between 150 nm and 2 micrometers.

* * * * *

UNITED STATES PATENT AND TRADEMARK OFFICE
CERTIFICATE OF CORRECTION

PATENT NO. : 10,761,320 B2  
APPLICATION NO. : 15/775946  
DATED : September 1, 2020  
INVENTOR(S) : Brett Sitter Page 1 of 1

It is certified that error appears in the above-identified patent and that said Letters Patent is hereby corrected as shown below:

In the Specification

Column 19  
Line 19, Delete "$10^4$ mm$^3$" and insert -- $10^4$ mm$^{-3}$ --, therefor.  
Line 19, Delete "$10^5$ mm$^3$" and insert -- $10^5$ mm$^{-3}$ --, therefor.  
Line 20, Delete "$10^8$ mm$^3$" and insert -- $10^8$ mm$^{-3}$ --, therefor.  
Line 20, Delete "$10^7$ mm$^3$" and insert -- $10^7$ mm$^{-3}$ --, therefor.

Column 20  
Lines 12-14, Delete "Article 801 can also be further processed to add additional layers as illustrated in FIGS. 8E-8G." and insert the same on Column 20, Line 15, as a beginning of the paragraph.

Signed and Sealed this  
Fourth Day of May, 2021

Drew Hirshfeld  
*Performing the Functions and Duties of the*  
*Under Secretary of Commerce for Intellectual Property and*  
*Director of the United States Patent and Trademark Office*